US010373402B2

(12) United States Patent
Kwak

(10) Patent No.: US 10,373,402 B2
(45) Date of Patent: Aug. 6, 2019

(54) COMMERCIAL DRIVER ELECTRONIC LOGGING RULE COMPLIANCE AND VEHICLE INSPECTION VOICE ASSISTANT SYSTEM

(71) Applicant: TrueLite Trace, Inc., Milpitas, CA (US)

(72) Inventor: Sung Bok Kwak, Milpitas, CA (US)

(73) Assignee: Truelite Trace, Inc., San Jose, CA (US)

( * ) Notice: Subject to any disclaimer, the term of this patent is extended or adjusted under 35 U.S.C. 154(b) by 155 days.

(21) Appl. No.: 15/497,179

(22) Filed: Apr. 25, 2017

(65) Prior Publication Data
US 2018/0308295 A1   Oct. 25, 2018

(51) Int. Cl.
```
G07C 5/00      (2006.01)
G06F 9/445     (2018.01)
G06Q 10/06     (2012.01)
G06F 9/44      (2018.01)
G08G 1/00      (2006.01)
G06F 8/65      (2018.01)
```

(52) U.S. Cl.
CPC .............. *G07C 5/008* (2013.01); *G06F 8/65* (2013.01); *G06F 9/44* (2013.01); *G06Q 10/06311* (2013.01); *G08G 1/20* (2013.01); *G06Q 10/063112* (2013.01); *G06Q 10/063116* (2013.01)

(58) Field of Classification Search
CPC .. G07C 5/008; G06F 8/65; G06F 9/44; G06Q 10/06311; G06Q 10/063112; G06Q 10/063116; G08G 1/20

USPC ........................................................ 701/29.3
See application file for complete search history.

(56) References Cited

U.S. PATENT DOCUMENTS

| | | | | |
|---|---|---|---|---|
| 5,600,775 A | * | 2/1997 | King | H04N 7/15 715/203 |
| 5,689,442 A | * | 11/1997 | Swanson | G08B 13/19647 340/500 |
| 9,476,792 B2 | * | 10/2016 | Gearhart | G01M 3/04 |

(Continued)

*Primary Examiner* — Tuan C To
(74) *Attorney, Agent, or Firm* — Invent Capture, LLC.; Samuel S. Cho

(57) ABSTRACT

A novel commercial driver electronic logging rule compliance and vehicle inspection voice assistant system provides time-shared commercial drivers and auto mechanics a novel platform to initiate, update, share, and authorize an ELD log and driver vehicle inspection report (DVIR) associated with a time-shared commercial vehicle. The ELD log and/or DVIR intelligently and automatically incorporates in-vehicle sensor data output values that are machine-interpreted by a vehicle OBD device, a vehicle electronic logging device (ELD), and a commercial fleet vehicle maintenance and ELD database management system. The commercial driver electronic logging rule compliance and vehicle inspection voice assistant system also operates and manages vehicle ELD rule compliance and inspection voice assistant applications that are executed by portable electronic devices utilized by time-shared commercial drivers and auto mechanics, wherein the vehicle ELD rule compliance and inspection voice assistant applications provide dynamic voice guidance to prevent regulatory violations and enable seamless regulatory compliance.

12 Claims, 9 Drawing Sheets

A System Block Diagram of a Commercial Driver Electronic Logging Rule Compliance and Vehicle Inspection Voice Assistant System
100

(56) References Cited

U.S. PATENT DOCUMENTS

| | | | |
|---|---|---|---|
| 2007/0173994 A1* | 7/2007 | Kubo | G07C 5/0858 701/32.4 |
| 2007/0216521 A1* | 9/2007 | Guensler | G08G 1/0104 340/439 |
| 2007/0260375 A1* | 11/2007 | Hilton | G01M 17/007 701/33.4 |
| 2007/0268158 A1* | 11/2007 | Gunderson | G06Q 40/08 340/933 |
| 2009/0119657 A1* | 5/2009 | Link, II | G06F 8/64 717/171 |
| 2009/0224869 A1* | 9/2009 | Baker | G07C 5/008 340/5.1 |
| 2013/0342368 A1* | 12/2013 | Nathanson | G07C 5/008 340/903 |
| 2017/0017927 A1* | 1/2017 | Domnick | G06Q 10/1091 |
| 2017/0221069 A1* | 8/2017 | Remboski | G07C 5/0825 |
| 2017/0262815 A1* | 9/2017 | Shipman | G06Q 10/20 |
| 2017/0287322 A1* | 10/2017 | Drake | G08C 17/02 |
| 2017/0295253 A1* | 10/2017 | Siegel | H04L 41/145 |
| 2018/0211170 A1* | 7/2018 | Domnick | G06N 5/04 |
| 2018/0225894 A1* | 8/2018 | Mays | G07C 5/0808 |
| 2018/0240164 A1* | 8/2018 | Midtbo | G06Q 30/04 |
| 2018/0268623 A1* | 9/2018 | Ambrose | G07C 5/085 |

* cited by examiner

A System Block Diagram of a Commercial Driver Electronic Logging Rule Compliance and Vehicle Inspection Voice Assistant System

100

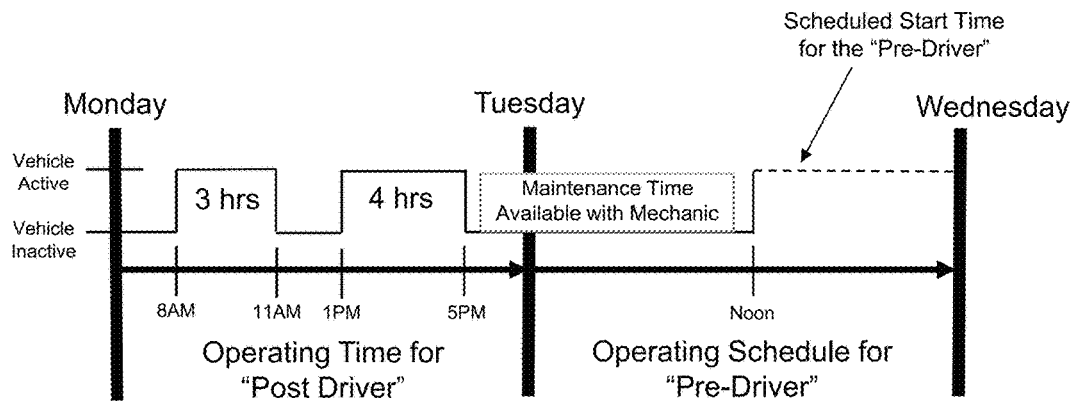

A Timing Diagram Example Among a "Post" Driver, an auto mechanic, and a "Pre" Driver for an ELD-Equipped Shared Vehicle Operation That Requires ELD Rule Compliance and Vehicle Inspection

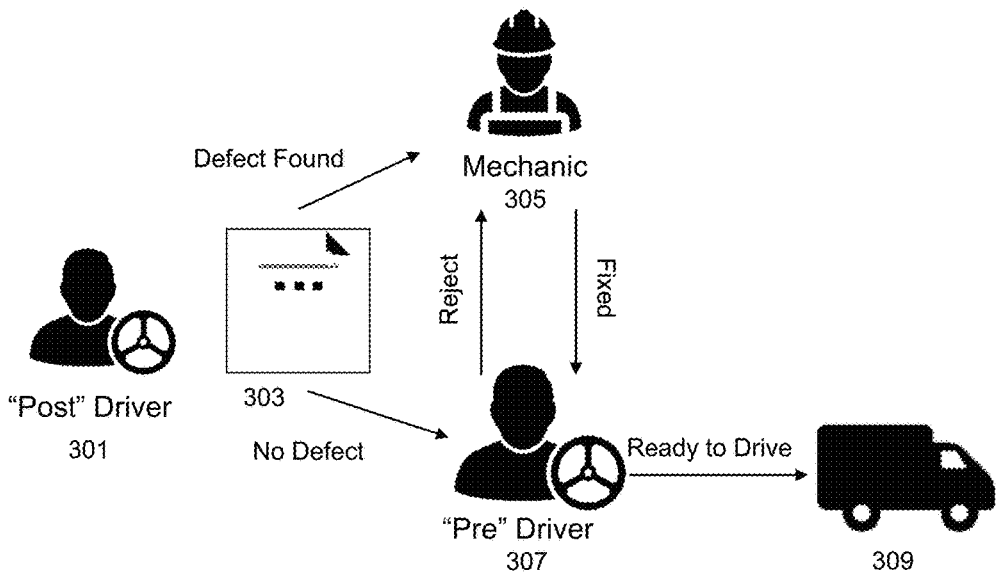

A Communication Flow Diagram Among Shared Vehicle Drivers and an Auto Mechanic Who Utilizes a Commercial Driver Electronic Logging Rule Compliance and Vehicle Inspection Voice Assistant System

An Application Flow Diagram of a "Post" Driver Vehicle ELD Rule Compliance and Inspection Voice Assistant Application
400

| Creator: SungChi | | Vin #: | |
|---|---|---|---|
| Created Date/time: 20160627 | | Odometer: | |
| Last Modifier: fleetupdemo | | Trailer Ref: | |
| Last Modified Date/time: 20160627 | | Report Reference Number: abcd | |
| Co-driver: | | US Dot Number: USDOT2131SFW13 | |
| Vehicle | | Trailer | |
| Essential Inspection List | Additional Inspection List | Essential Inspection List | Additional Inspection List |
| Engine | Air Compressor | Brake Connections | Doors |
| Transmission | Air Lines | Brakes | Hitch |
| x Clutch | x Battery | Coupling Devices | Landing Gear |
| Steering Mechanism | x Belts and Hoses | Lighting Devices | Roof |
| Horn | Brake Accessories | Lugs and Tires | x Suspension System |
| x Windshield Wipers/ Washers | Body | Wheels and rims | Tarpaulin |
| x Rear Vision Mirror | Defroster/ Heater | Coupling (King) Pin | |
| Lighting Devices and Reflectors | Driver Line | Air Line Connections, Hoses, and | |
| Parking Brake | Exhaust | Couplers | |
| Service Brakes and Trailer Brake | Fifth Wheel | Rails and Support Frames | |
| Connections | Fluid Levels | x Tie Down Bolsters | |
| x Coupling Devices | Frame and Assembly | Locking Pins, Clevises, Clamps, | |
| Tires | Front Axle | Hooks | |
| Wheels and Rims | Fuel Tanks | Sliders, Sliding Frame Lock | |
| Emergency equipment | Muffler | | |
| | Oil Pressure | | |
| | Radiator | | |
| | Rear End | | |
| | Starter | | |
| | Suspension System | | |
| | Tire Chains | | |
| | Trip Recorder | | |
| Post Driver's Remarks : 4064 | Mechanic's Remarks | Pre Driver's Remarks : | Admin's Remarks |
| CheckInspectionList. | | | |
| Post Driver's signature does not exist. | Mechanic's signature does not exist. Click 'Mechanic Sign' button below to sign. Mechanic Sign | Pre Driver's signature does not exist. | |

A User Interface Example of a Mobile or Web DVIR Incorporated in a Commercial Driver Electronic Logging Rule Compliance and Vehicle Inspection Voice Assistant System

A User Interface Screenshot from an Auto Mechanic's Vehicle ELD Rule Compliance and Inspection Voice Assistant Application

600

An Application Flow Diagram from a "Pre" Driver Vehicle ELD Rule Compliance and Inspection Voice Assistant Application

700

A System Block Diagram Example for a Vehicle Electronic Logging Device (ELD)

800

An Embodiment of a Vehicle Electronic Logging Device (ELD) Management Module

900

An Example of a Portable Electronic Device Incorporating a Vehicle ELD Rule Compliance and Inspection Voice Assistant Application(s)

1000

COMMERCIAL DRIVER ELECTRONIC LOGGING RULE COMPLIANCE AND VEHICLE INSPECTION VOICE ASSISTANT SYSTEM

BACKGROUND OF THE INVENTION

The present invention generally relates to one or more electronic systems for vehicle inspection-related information logging, analysis, and communications. More specifically, various embodiments of the present invention relate to real-time remote monitoring of vehicle maintenance needs analysis and vehicle sensor-based automated vehicle inspection reporting communications among vehicle-sharing commercial drivers and a commercial fleet auto mechanic for regulatory compliance of commercial vehicles. Furthermore, various embodiments of the present invention also relate to vehicle electronic logging authorization and handover systems associated with federal, national, state, or local commercial vehicle safety requirements and regulatory compliance.

Commercial vehicle drivers, such as truck and bus drivers, are increasingly regulated and required by state, federal, national, and/or municipal governments to conduct mandatory vehicle condition inspections and generate related reports between active driving operations. For example, in the United States, a commercial vehicle driver may be required to record the initial condition of a commercial vehicle before driving and the subsequent condition of the commercial vehicle after an extended driving activity. Moreover, in certain states and municipalities, commercial vehicles are legally required to undergo routine maintenance after operating a certain number of miles or after elapsing a certain number of days since the last routine maintenance. An auto mechanic who is designated to perform routine or on-demand maintenance of the commercial vehicle may also be required to access and update the driver-generated vehicle inspection information to keep the commercial vehicle in good and safe working conditions, as required by law and/or by company policies.

Furthermore, commercial vehicle drivers are also increasingly regulated and required by governments to record their driving activities and rest periods. For example, a commercial vehicle driver may be required to take a mandatory thirty-minute break after eight hours of consecutive driving or active on-duty tasks associated with the commercial vehicle (i.e. "30-minute required break per consecutive 8-hour drive"). The commercial vehicle driver may also be required to abide by other mandatory rest requirements, such as a consecutive rest period of thirty-four hours for every non-consecutive sixty hours of active on-duty driving per week (i.e. "60-hour cycle limit"), or a consecutive rest period of ten hours, including eight hours of sleep, for every non-consecutive eleven hours of active on-duty driving (i.e. "11-hour driving limit"). A regulatory violation intentionally or inadvertently caused by a commercial vehicle driver may result in stiff penalties or fines to both the commercial vehicle driver and a related vehicle fleet operator.

In the past, the regulatory compliance for mandatory driver rest periods and vehicle maintenance for commercial vehicle operations was primarily satisfied by recording driver logs on paper (i.e. in form of "vehicle driver log" documents). In recent years, electronic driver activity-logging devices have further assisted commercial vehicle drivers to enter or verify their active driving or resting statuses in electronically-generated driver activity logs. The electronically-generated driver activity logs are typically designed to be periodically audited and reviewed by regulatory authorities and/or fleet operation managers to improve traffic safety and to provide legal compliance. In many cases, the electronically-generated driver activity logs are configured to be tamperproof or "locked" from further adjustments by relevant commercial vehicle driver(s) after a set amount of time (e.g. 12 hours, 24 hours, etc.) has elapsed from the actual time of data recording. The time elapse-triggered "locking" of the electronically-generated driver activity logs is intended to preserve the integrity of the driver activity logs for more robust regulatory compliance associated with mandatory commercial driver resting requirements.

However, conventional paper-based or electronically-generated driver activity logs do not address specialized circumstances in which a multiple number of commercial vehicle drivers share a commercial vehicle for a variety of on-duty driving operations on various time frames (e.g. hourly, daily, weekly, monthly, etc.). For example, it is difficult to generate and maintain accurate and reliable driver activity and driver-generated vehicle inspection logs for a multiple number of commercial vehicle drivers who time-share a commercial vehicle, especially if those time-sharing commercial vehicle drivers also need to routinely communicate with designated auto mechanics to follow up on the driver-generated vehicle inspection logs for any needed repairs or maintenance items.

Therefore, it may be desirable to devise a novel commercial driver vehicle inspection and driver log-tracking communication system that seamlessly provides log tracking and related multi-party communications among vehicle time-sharing drivers, auto mechanics, fleet managers, and regulatory compliance authorities. Furthermore, it may also be desirable to devise a dynamically-adaptable intelligent voice assistant that is incorporated into the novel commercial driver vehicle inspection and driver log-tracking communication system to guide time-sharing drivers and auto mechanics through a series of steps for initiating and updating vehicle inspection and maintenance logs using voice assistance in their native languages. In addition, it may also be desirable to devise a novel method for operating the novel commercial driver vehicle inspection and driver log-tracking communication system for multi-party utilization.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a commercial driver electronic logging rule compliance and vehicle inspection voice assistant system is disclosed. This system comprises: a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, OBD fault codes, and other vehicle diagnostics data as a raw OBD data stream; a vehicle electronic logging device (ELD) connected to the vehicle OBD device, wherein the vehicle ELD is configured to generate at least one of a driver-specific ELD log and a driver vehicle inspection report (DVIR) that contains a currently logged-in driver's on-duty, off-duty, and resting activities associated with the vehicle and descriptions, issues, and items identifying potential repair or maintenance needs for the vehicle; an ELD and OBD data transceiver connected to the vehicle ELD, wherein the ELD and OBD data transceiver is configured to transmit ELD, DVIR, and OBD data to components of the commercial driver electronic logging rule compliance and vehicle inspection voice assistant system that are remotely located outside the vehicle; a "post" driver vehicle ELD rule compliance and inspection voice assistant application executed in a first portable electronic device for the currently logged-in driver, whose driving activities and vehicle repair or maintenance needs are currently interpreted, analyzed, and recorded by the vehicle ELD as the driver-specific ELD log and the DVIR, wherein the "post" driver vehicle ELD rule compliance and inspection voice assistant application provides a first interactive voice guidance to the "post" driver to ensure regulatory compliance for at least one of the driver-specific ELD log and the DVIR creation and modifications; an auto mechanic's vehicle ELD rule compliance and inspection voice assistant application executed in a second portable electronic device for the auto mechanic, who reviews at least one of the driver-specific ELD log and the DVIR from the "post" driver vehicle ELD rule compliance and inspection voice assistant application to verify and work on the vehicle repair or maintenance needs, wherein the auto mechanic's vehicle ELD rule compliance and inspection voice assistant application provides a second interactive voice guidance to the auto mechanic to ensure the regulatory compliance to the auto mechanic as the auto mechanic repairs the vehicle and modifies the DVIR for each item or issue listed in the DVIR; a "pre" driver vehicle ELD rule compliance and inspection voice assistant application executed in a third portable electronic device for the "pre" driver, who reviews the DVIR from the auto mechanic's vehicle ELD rule compliance and inspection voice assistant application to conduct a visual and functional inspection of completed repairs for each item or issue listed in the DVIR, wherein the "pre" driver vehicle ELD rule compliance and inspection voice assistant application provides a third interactive voice guidance to the "pre" driver to ensure the regulatory compliance to the "pre" driver for verification of the completed repairs and finalization of the DVIR for regulatory submission; a commercial fleet operation vehicle maintenance and ELD database management system that analyzes, stores, and categorizes a plurality of driver-specific ELD logs and DVIR case files for a plurality of drivers who time-share the vehicle; and a data communication network configured to provide a wireless data information transfer among the vehicle ELD, the ELD and OBD data transceiver, the first portable electronic device, the second portable electronic device, the third portable electronic device, and the commercial fleet operation vehicle maintenance and ELD database management system.

BRIEF DESCRIPTION OF DRAWINGS

FIG. 2 shows a timing diagram example among a "post" driver, an auto mechanic, and a "pre" driver for an ELD-equipped shared vehicle operation that requires vehicle inspection a d ELD rule compliance.

FIG. 3 shows a communication flow diagram among shared vehicle drivers and an auto mechanic who utilizes a commercial driver electronic logging rule compliance and vehicle inspection voice assistant system, in accordance with an embodiment of the invention.

FIG. 5 shows a user interface example of a mobile or web driver vehicle inspection report (DVIR) incorporated in a commercial driver electronic logging rule compliance and vehicle inspection voice assistant system, in accordance with an embodiment of the invention.

DETAILED DESCRIPTION

Figure 1:
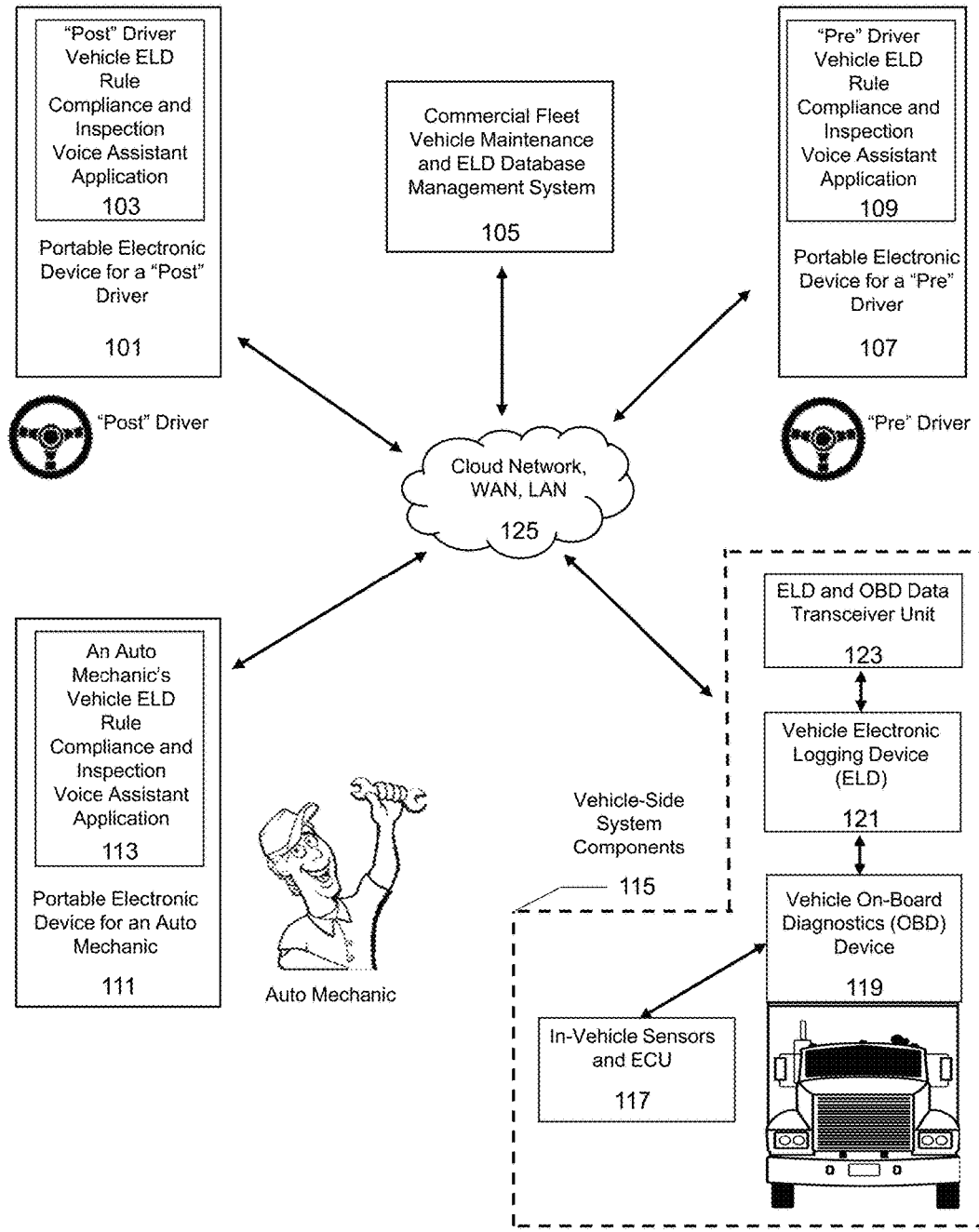
FIG. 1 shows a system block diagram of a commercial driver electronic logging rule compliance and vehicle inspection voice assistant system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel commercial driver vehicle inspection and driver log-tracking communication systems with dynamic voice assistance that seamlessly provide driver log and vehicle inspection tracking and related multi-party communications among vehicle time-sharing drivers, auto mechanics, fleet managers, and regulatory compliance authorities These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term "vehicle on-board diagnostics (OBD) device" is defined as an electronic device installed in a vehicle to collect and/or analyze a variety of vehicle-related data. In one example, the vehicle OBD device outputs many data parameters in real-time, such as vehicle diagnostic information (e.g. engine temperature, oil level, OBD codes, and etc.), fuel consumption-related information, vehicle speed information, vehicle acceleration and deceleration information (i.e. measured in g-force or in SI units), ambient air temperature information, engine rotation-per-minute (RPM) information, vehicle location information, and other vehicle-related data. The OBD device is typically connected to an engine control unit (ECU) and a plurality of in-vehicle control or sensor components, such as an accelerometer, a speedometer, a thermostat, a barometer, an emissions control unit, a vehicle electronics control unit, and any other in-vehicle electronics components to check and diagnose the current condition of each connected vehicle component.

Output data parameters from the vehicle OBD device may be utilized to determine a driver's driving activity status, a vehicle malfunction status, or a vehicle repair need. For example, if the vehicle has a nonzero speed for a certain amount of time while its engine is running, an associated commercial driver's driving activity status may be determined by a vehicle electronic logging device as being engaged in an "on-duty" status. In another example, if the vehicle has a zero speed for a certain amount of time while its engine is idling, the associated commercial driver's driving activity status may be determined by the vehicle electronic logging device as still being engaged in an "on-duty" status. On the other hand, if the vehicle's engine itself is turned off for a certain amount of time, the associated commercial driver's driving activity status may be determined by the vehicle electronic logging device as being "off-duty," inactive, and/or restful from work. Furthermore, an OBD malfunction code or an abnormal data reading as part of the output data parameters from the vehicle OBD device may indicate or identify the source and the state of the vehicle malfunction.

These data parameters may also be correlated to timestamps generated by an electronic clock associated with the vehicle OBD device. In one embodiment of the invention, the data parameters may be generated by the vehicle OBD device in a region-specific, maker-specific, and/or model-specific format, which requires interpretation and conversion to a compatible output format decodable by a vehicle electronic logging device, a mobile application executed on a portable electronic device, and/or a remotely-located commercial fleet operation vehicle electronic logging database and management system.

Furthermore, for the purpose of describing the invention, a term referred herein as "vehicle electronic logging device," or "ELD," is defined as a specialized driver activity log-generating electronic device connected to a vehicle OBD device. This specialized driver activity log-generating electronic device analyzes real-time OBD output data parameters to objectively derive or confirm an ongoing driver activity and/or vehicle repair needs in a commercial vehicle. For example, a vehicle ELD can measure and objectively confirm a commercial vehicle driver's on-duty driving by tracking a nonzero vehicle speed data parameter and an engine "on" status signal from the vehicle OBD device, until the commercial vehicle driver stops and turns off the engine. Similarly, the vehicle ELD can objectively measure and confirm the commercial vehicle driver's off-duty resting period with a system clock and a duration of the engine "off" status signal.

Moreover, the vehicle ELD may be configured to monitor, track, and record vehicle malfunction codes from the OBD device and incorporate them automatically in a driver vehicle inspection report, which may be initiated, updated, or rectified by a commercial vehicle driver and/or a designated auto mechanic In addition, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD connected to an in-vehicle data transceiver unit, which further communicates with a remotely-located monitoring station.

In a preferred embodiment of the invention, the vehicle ELD is also configured to accept the commercial vehicle driver's manual data entry, which is then automatically compared against and/or merged with machine-determined driver's activity log information derived from the vehicle OBD device to complete synthesis of an electronically-generated driver activity log that incorporates both objective (i.e. machine-determined) and subjective (i.e. driver-entered) information for enhanced details and accuracy.

Furthermore, for the purpose of describing the invention, a term referred herein as "post driver" is defined as a commercial vehicle driver who just completed his or her driving operation in a time-shared vehicle, which is typically shared with other drivers in designated work schedules. In a preferred embodiment of the invention, a "post driver" has an regulatory and/or internal corporate policy obligation to complete a series of steps to create or update a driver's vehicle inspection report (DVIR) provided by a commercial driver electronic logging rule compliance and vehicle inspection voice assistant system. The DVIR is then transmitted to a commercial fleet vehicle maintenance and ELD database management system and to electronic devices utilized by a designated auto mechanic and a next time-shared driver (i.e. also referred herein as a "pre driver"). The designated auto mechanic reviews the DVIR sent by the "post driver," and performs repairs or maintenance items on the time-shared vehicle. Once necessary repairs or maintenance items are completed, the next time-shared driver (i.e. the "pre driver") compares the "post driver's" DVIR against the current (i.e. post-repair) conditions of the time-shared vehicle, and signs off on the DVIR electronically via the commercial driver electronic logging rule compliance and vehicle inspection voice assistant system, if the current conditions are satisfactory.

In addition, for the purpose of describing the invention, a term referred herein as "pre driver" is defined as a commercial vehicle driver who is about to initiate his or her driving operation in a time-shared vehicle after the completion of the "post driver's" driving operation and any subsequent vehicle maintenance-related repairs. In a preferred embodiment of the invention, a "pre driver" has an regulatory and/or internal corporate policy obligation to complete a series of steps to review and sign off the DVIR transmitted from the "post driver" or from a designated auto mechanic via a commercial driver electronic logging rule compliance and vehicle inspection voice assistant system, if the current conditions of the time-shared vehicle are satisfactory. If the current conditions of the time-shared vehicle are not satisfactory, then the "pre driver" can inform the designated auto mechanic that repair works have not been properly completed and send the time-shared vehicle back to the designated auto mechanic's shop.

Moreover, for the purpose of describing the invention, a term referred herein as "portable electronic device" is defined as a smart phone, a tablet computer, a notebook computer, a special-purpose proprietary ELD data controller device, or another transportable electronic device that can execute a vehicle ELD rule compliance and inspection voice assistant application for a commercial vehicle driver or an auto mechanic.

Furthermore, for the purpose of describing the invention, a term referred herein as "remote monitoring station unit" is defined as a vehicle fleet monitoring location for one or more commercial vehicles in operation. Examples of remote monitoring station units include, but are not limited to, a commercial vehicle operation control center, a regulatory traffic safety enforcement agency, a vehicle monitoring service center, and a fleet vehicle employer's information technology (IT) control center. Typically, the remote monitoring station unit is configured to execute and operate a commercial fleet vehicle maintenance and ELD database management system.

In addition, for the purpose of describing the invention, a term referred herein as "computer server" is defined as a physical computer system, another hardware device, a software module executed in an electronic device, or a combination thereof. Furthermore, in one embodiment of the invention, a computer server is connected to one or more data networks, such as a local area network (LAN), a wide area network (WAN), a cellular network, and the Internet. Moreover, a computer server can be utilized by a vehicle monitoring personnel for gathering and analyzing electronically-generated commercial vehicle driver logs that are stored, updated, and modified by a commercial fleet vehicle maintenance and ELD database management system.

One aspect of the present invention is providing a novel commercial driver electronic logging rule compliance and vehicle inspection voice assistant system that seamlessly provides log tracking and related multi-party communications among vehicle time-sharing drivers, auto mechanics, fleet managers, and regulatory compliance authorities.

In addition, another aspect of the present invention is providing a dynamically-adaptable intelligent voice assistant application that is incorporated into the novel commercial driver electronic logging rule compliance and vehicle inspection voice assistant system to guide time-sharing drivers and auto mechanics through a series of steps for initiating and updating vehicle inspection and maintenance logs using voice assistance in their native languages.

Furthermore, another aspect of the present invention is providing a novel method for operating the commercial driver electronic logging rule compliance and vehicle inspection voice assistant system for multi-party utilization among "post" drivers "pre" drivers, auto mechanics, and commercial vehicle fleet managers.

FIG. 1 shows a system block diagram (100) of a commercial driver electronic logging rule compliance and vehicle inspection voice assistant system, in accordance with an embodiment of the invention. In a preferred embodiment of the invention, the commercial driver electronic logging rule compliance and vehicle inspection voice assistant system comprises an automotive vehicle, a vehicle on-board diagnostics (OBD) device (119) installed in the automotive vehicle, in-vehicle sensors and an engine control unit (117) connected to the OBD device (119), a vehicle electronic logging device (ELD) (121), an ELD and OBD data transceiver unit (123), a portable electronic device (101) for a "post" driver, a "post" driver vehicle ELD rule compliance and inspection voice assistant application (103) executed on the portable electronic device (101) for the "post" driver, a portable electronic device (107) for a "pre" driver, a "pre" driver vehicle ELD rule compliance and inspection voice assistant application (109) executed on the portable electronic device (107) for the "pre" driver, a portable electronic device (111) for a designated auto mechanic, an auto mechanic's vehicle ELD rule compliance and inspection voice assistant application (113) executed on the portable electronic device (111), a commercial fleet vehicle maintenance and ELD database management system (105), and a wired and/or wireless data network (125).

As shown in the system block diagram (100) in FIG. 1, the in-vehicle sensors and the ECU (117), the vehicle OBD device (119), the vehicle ELD (121), and the ELD and OBD data transceiver unit (123) are typically incorporated physically in the automotive vehicle as vehicle-side system components (115) of the commercial driver electronic logging rule compliance and vehicle inspection voice assistant system. In the preferred embodiment of the invention, the automotive vehicle is a truck, a van, a bus, or another commercial operation-registered vehicle, which is typically utilized for commercial transport of freight and/or passengers that involve state, federal, municipal, and/or corporate regulations for commercial vehicle maintenance and record-keeping requirements based on mileage, calendar days, and/or hours of service for each driver. In another embodiment of the invention, the automotive vehicle may be a private vehicle (i.e. not registered as a commercially-operated vehicle), which is shared among a plurality of drivers via car ride-sharing services or passenger transport services.

Furthermore, the vehicle OBD device (119) is a specialized electronic device installed in the automotive vehicle to collect and/or analyze a variety of vehicle-related data, including engine on/off status, engine temperature, OBD fault codes, speed, acceleration, ambient air temperature, ambient air pressure, engine rotation-per-minute (RPM), vehicle location, and other vehicle-related output parameters generated by an engine control unit (ECU), a transmission control module (TCM), an accelerometer, a barometer, a fuel pressure sensor, other in-vehicle sensors (e.g. 117), or other electronic components connected to the vehicle OBD device (119). In the preferred embodiment of the invention as shown in FIG. 1, output data parameters from the vehicle OBD device (119) are utilized to formulate at least part of a driver vehicle inspection report (DVIR), which may indicate that the automotive vehicle requires repairs or maintenance work based on OBD fault codes or other data parameters generated from the vehicle OBD device (119). The vehicle OBD device (119) may also be utilized to determine a driver's driving activity status via the vehicle electronic logging device (ELD) (121), which requires each time-shared commercial vehicle driver of the same automotive vehicle to log in or log off electronically to indicate time periods of specific driver activity.

Continuing with the embodiment of the invention as shown in FIG. 1, any OBD fault codes or data parameters from the vehicle OBD device (119) that are related to vehicle repair or maintenance needs become part of a particular driver's DVIR automatically even without human intervention, and are further analyzed and stored by the vehicle ELD (121) and the commercial fleet vehicle maintenance and ELD database management system (105). Local OBD fault codes and other in-vehicle sensor-originating data that are specific to the automotive vehicle can be remotely transmitted to and further processed by the commercial fleet vehicle maintenance and ELD database management system (105) via the ELD and OBD data transceiver unit (123) and the wired and/or wireless data network (125).

For example, if the automotive vehicle develops an engine cylinder misfire problem while the "post" driver was electronically logged in the vehicle ELD (121), the vehicle OBD device (119) generates an OBD fault code specific to the engine cylinder misfire, and the OBD fault code is then automatically and intelligently incorporated into the "post" driver's vehicle inspection report (i.e. "post" driver's DVIR). The "post" driver's DVIR that utilizes intelligent machine importation of vehicle sensory and OBD fault code information can also be further adjusted, updated, and reviewed by the "post" driver. In particular, the "post" driver's DVIR is configured to identify any necessary repairs or maintenance work before the next driver (i.e. the "pre" driver) operates the time-shared automotive vehicle.

As shown in the preferred embodiment of the invention of FIG. 1, the "post" driver is able to create, amend, and transmit the "post" driver's DVIR by accessing the "post" driver vehicle ELD rule compliance and inspection voice assistant application (103) executed on the portable electronic device (101) for the "post" driver. This portable electronic device (101) is operatively connected to the ELD and OBD data transceiver unit (123) in the automotive vehicle and also to the commercial fleet vehicle maintenance and ELD database management system (105) via the wired and/or wireless data network (125). The "post" driver vehicle ELD rule compliance and inspection voice assistant application (103) is designed to provide interactive and dynamic voice guidance to the "post" driver throughout the "post" driver's DVIR creation, amendment, signoff, and transmission processes to ensure seamless regulatory compliance associated with DVIR recordkeeping. The interactive and dynamic voice guidance is typically not a pre-recorded static voice narration, but rather an intelligent artificial intelligence-based voice guidance that incorporates real-time changes in vehicle repair or maintenance needs and real-time updates to the "post" driver's DVIR content. For example, when the "post" driver is about to start the automotive vehicle for a commercial vehicle operation, the "post" driver vehicle ELD rule compliance and inspection voice assistant application (103) is able to decipher the "post" driver's behavior and generate a machine-generated voice reminder to ensure that the "post" driver creates or signs into a driver's vehicle inspection report (DVIR) prior to commencement of the commercial vehicle operation.

Likewise, for any OBD fault codes or potential repair needs that the vehicle OBD device (119) and the commercial fleet vehicle maintenance and ELD database management system (105) may have identified, the "post" driver vehicle ELD rule compliance and inspection voice assistant application (103) can guide the "post" driver through at least some portions of machine-identified repair work need to confirm the necessity of repair work. The confirmation of the necessity of repair work may involve the "post" driver's visual inspection or manual function test of the automotive vehicle, before the "post" driver's DVIR is formalized. These procedures are preferably voice-guided by the "post" driver vehicle ELD rule compliance and inspection voice assistant application (103). Subsequently, the formalized version of the "post" driver's DVIR can be "signed off" by the "post" driver, and then be shared with the auto mechanic's vehicle ELD rule compliance and inspection voice assistant application (113), the "pre" driver's vehicle ELD rule compliance and inspection voice assistant application (109), and/or the commercial fleet vehicle maintenance and ELD database management system (105) via the wired and/or wireless data network (125), as shown on FIG. 1.

A typical process flow after the formalization of the "post" driver's DVIR involves the auto mechanic reviewing the "post" driver's DVIR via the auto mechanic's vehicle ELD rule compliance and inspection voice assistant application (113) executed in the portable electronic device (111). The auto mechanic may be required to go through a checklist of potential vehicle repair or maintenance needs from the "post" driver's DVIR. If any vehicle repair or maintenance work is merited at the auto mechanic's discretion, the auto mechanic may perform necessary work on the automotive vehicle, and update the "post" driver's DVIR accordingly, preferably through an interactive voice guidance provided by the auto mechanic's vehicle ELD rule compliance and inspection voice assistant application (113). The interactive voice guidance ensures that the required analytical and procedural steps for regulatory compliance are fully satisfied, even if the auto mechanic was not familiar with DVIR and ELD recordkeeping procedures required by federal, state, municipal, or corporate entities.

The interactive and dynamic voice guidance from the auto mechanic's vehicle ELD rule compliance and inspection voice assistant application (113) is typically not a pre-recorded static voice narration, but rather an intelligent artificial intelligence-based voice guidance that incorporates real-time changes in vehicle repair or maintenance needs and real-time updates to the "post" driver's DVIR content. For example, if the auto mechanic does not appear to have sufficient time to complete all of the listed repair or maintenance work in the "post" driver's DVIR before the "pre" driver's scheduled operation time, the interactive and dynamic voice guidance from the auto mechanic's vehicle ELD rule compliance and inspection voice assistant application (113) may ask the auto mechanic to contact the "pre" driver or to initiate a vehicle reassignment schedule for the "pre" driver, so that a sufficient time period can be allocated to complete necessary repair or maintenance work for the automotive vehicle linked to the "post" driver's DVIR.

After the "post" driver's DVIR is reviewed and further updated by the auto mechanic after necessary repairs or maintenance work, the auto mechanic-reviewed and amended version of the "post" driver's DVIR is transmitted to the "pre" driver's vehicle ELD rule compliance and inspection voice assistant application (109) and/or the commercial fleet vehicle maintenance and ELD database management system (105) via the wired and/or wireless data network (125), as shown on FIG. 1. Subsequently, the "pre" driver's vehicle ELD rule compliance and inspection voice assistant application (109), which is executed on the portable electronic device (107) for the "pre" driver, displays the auto mechanic-reviewed and amended version of the "post" driver's DVIR, and also generates an interactive voice guidance to enable the "pre" driver to review each of the auto mechanic-checked or repaired items before commencing a new commercial driving activity within the "pre" driver's work schedule. If there are items on the DVIR checklist that are not repaired properly by the designated auto mechanic, the "pre" driver may elect to refuse signing on the auto mechanic-reviewed and amended version of the "post" driver's DVIR, and may even send the time-shared automotive vehicle back to the designated auto mechanic for appropriate repair or maintenance work. On the other hand, if the "pre" driver agrees that all of the items on the DVIR checklist are satisfactorily addressed, then the "pre" driver may confirm or verify with a signature that the auto mechanic-reviewed and amended version of the "post" driver's DVIR is satisfactory, indicating that the time-shared automotive vehicle, in the "pre" driver's opinion, meets all of the functional and safety requirements expected in commercial driving activities.

In the preferred embodiment of the invention, the interactive voice guidance provided by a plurality of vehicle ELD rule compliance and inspection voice assistant applications (e.g. 103, 109, 113) empowers drivers and auto mechanics to execute intelligent and dynamic data-incorporating voice guidance in their native languages, such as English, Spanish, Chinese, and Hindi. The multi-language voice guidance capabilities of the commercial driver electronic logging rule compliance and vehicle inspection voice assistant system further enhance driver inspection report and vehicle maintenance recordkeeping regulatory compliance rates for all participants (i.e. commercial vehicle drivers, designated auto mechanics, other fleet commercial operations employees, etc.), regardless of their native languages and cultural background.

Furthermore, in one embodiment of the invention, the vehicle ELD (121) is capable of tracking each driver's activity status. For example, if the automotive vehicle has a nonzero speed for a particular amount of time while its engine is running, the driver's driving activity status is analyzed, determined, and recorded by the vehicle ELD (121) as being engaged in an "on-duty" status. The vehicle ELD (121) is capable of objectively determining and confirming the driver's "on-duty" or active driving status by analyzing the incoming machine-generated vehicle-related output parameters from the vehicle OBD device (119) in real time. The record generated and stored by the vehicle ELD (121) becomes an electronic driver activity log (e.g. active, inactive, resting, sleeping, etc.) correlated to a system time clock, and in some instances, become part of a driver's vehicle inspection report (DVIR). Moreover, in the preferred embodiment, the vehicle ELD (121) also enables the driver to manually enter or describe his or her driving status (e.g. active, inactive, resting, sleeping, etc.) correlated to the system time clock. Preferably, the vehicle ELD (121) accepts the driver's manual data entry to compare against and/or merge with machine-determined driver's activity log information derived from the vehicle OBD device (119), and completes synthesis of the electronically-generated driver activity log that incorporates both objective (i.e. machine-determined) and subjective (i.e. driver-entered) information for enhanced details and accuracy.

In another example, if the automotive vehicle has a zero speed for a certain amount of time while its engine is idling, the associated commercial driver's driving activity status may be determined by the vehicle ELD (121) as still being engaged in an "on-duty" status, which counts toward the driver's on-the-job active hours, and not toward the mandatory rest period. On the other hand, if the vehicle's engine itself is turned off for a certain amount of time, the associated driver's driving activity status may be determined by the vehicle ELD (121) as being "off-duty," inactive, and/or restful from work, and recorded by the vehicle ELD (121) as part of the mandatory rest period. In the preferred embodiment of the invention, the vehicle ELD (121) is configured to associate and/or record timestamps generated by a system clock with durations and changes in each driving activity status, which also become part of the electronically-generated driving activity logs for a plurality of drivers that time-share the automotive vehicle.

Furthermore, the vehicle ELD (121), as shown in FIG. 1, is a specialized driver activity log-generating electronic device connected to the vehicle OBD device (119). In the preferred embodiment, the vehicle ELD (121) is a discrete piece of hardware device operatively connected to the vehicle OBD device (119) via a physical cable or a wireless communication protocol. In another embodiment, the vehicle ELD (121) is an integrated device that incorporates the vehicle OBD device (119) within its physical casing.

In the preferred embodiment of the invention, the vehicle ELD (121) is configured to analyze real-time OBD output data parameters to objectively derive or confirm an ongoing driver activity. For example, the vehicle ELD (121) can measure and objectively confirm a commercial vehicle driver's on-duty driving by tracking a nonzero vehicle speed data parameter and an engine "on" status signal from the vehicle OBD device, until the commercial vehicle driver stops and turns off the engine.

Similarly, the vehicle ELD (121) can objectively measure and confirm the commercial vehicle driver's off-duty resting period with a system clock and a duration of the engine "off" status signal. In some cases, the vehicle ELD (121), either singularly or in combination with the commercial fleet vehicle maintenance and ELD database management system (105), is also configured to analyze the real-time OBD output data parameters to detect vehicle maintenance or repair needs in the automotive vehicle. Preferably, the commercial driver electronic logging rule compliance and vehicle inspection voice assistant system is also configured to generate a "pre-violation" alert as part of a machine-generated dynamic voice guidance to commercial vehicle drivers to prevent a regulatory violation before an actual violation related to commercial vehicle drivers' resting requirements, speed limit requirements, substitute driver requirements, vehicle maintenance reporting requirements, and/or other regulatory issues is triggered. The "pre-violation" alert can also prevent unnecessary fines or penalties arising from commercial vehicle drivers' accidental or intentional violations of federal, state, and/or municipal regulatory requirements. The machine-generated dynamic voice guidance that incorporates the "pre-violation" alert may utilize real-time data output parameters from the in-vehicle sensors and ECU (117), the vehicle OBD device (119), the vehicle ELD (121), or cloud-based historical vehicle performance or driver behavioral data accessed from the commercial fleet vehicle maintenance and ELD database management system (105).

Furthermore, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD (121) connected to the in-vehicle ELD and OBD data transceiver unit (123). The in-vehicle ELD and OBD data transceiver unit (123) is configured to communicate wirelessly with portable electronic devices and/or computer servers via a cellular network, a satellite network, a wireless LAN, another wireless data network, or a combination thereof, wherein the portable electronic devices and/or the computer servers are operated by a remote monitoring station overseeing the commercial fleet vehicle maintenance and ELD database management system (105) and a plurality of drivers, auto mechanics, fleet managers, and authorities, as shown in FIG. 1.

Continuing with the preferred embodiment of the invention as shown in FIG. 1, each of the portable electronic devices (i.e. 101, 107, 111) for the "post" driver, the auto mechanic, and the "pre" driver is a smart phone, a tablet computer, a laptop computer, a desktop computer, a specialized proprietary commercial fleet management electronic device, or another portable electronic device, which is configured to execute one or more vehicle ELD rule compliance and inspection voice assistant applications (i.e. 103, 109, 113) in a CPU/APU (i.e. a central processing unit or an application processing unit) and a memory unit of each portable electronic device. The portable electronic devices utilized by the "post" driver, the auto mechanic, and the "pre" driver are operatively connected to each other and other elements (e.g. 105, 115, etc.) of the vehicle electronic logging authorization and handover system via the wired and/or wireless data network (125), which may include a cellular network, a satellite network, a wireless LAN, a cloud-computing resource network, or a combination thereof.

As shown by the embodiment of the invention illustrated in FIG. 1, the "post" driver vehicle ELD rule compliance and inspection voice assistant application (103), the auto mechanic's vehicle ELD rule compliance and inspection voice assistant application (113), the "pre" driver vehicle ELD rule compliance and inspection voice assistant application (109), and the vehicle-side system components (115) can communicate each other directly on a peer-to-peer basis in the wired and/or wireless data network (125). Alternatively, electronic communications and data transfer among these elements can be mediated, managed, or controlled by the commercial fleet vehicle maintenance and ELD database management system (105), which is typically executed and hosted by one or more computer servers in a remote monitoring station. For example, the commercial fleet vehicle maintenance and ELD database management system (105) may have data correction or overriding privileges to amend erroneous ELD log and DVIR entries before or after the data lockout period for recent ELD log entries and DVIR entries, depending on federal, state, municipal, and/or corporate regulatory compliance rules for the data lockout. In another example, the commercial fleet vehicle maintenance and ELD database management system (105) may intervene, overtake, or correct communication disruptions or no responses among a plurality of vehicle ELD rule compliance and inspection voice assistant applications (103, 109, 113) and vehicle-side system components (115), if a particular time-sharing vehicle driver (e.g. a "post" driver, a "pre" driver, etc.), an auto mechanic, or another related participant fails to respond to another entity's repeated requests to send, modify, or sign on the ELD log and/or the DVIR entries.

It should be noted that federal, state, municipal, and/or corporate regulations may require each commercial vehicle driver to finalize his or her on-duty ELD log and DVIR entries within a defined time limit (e.g. within 24 hours of on-duty vehicle operation, etc.) before freezing and locking the contents of the ELD and DVIR logs from additional modifications to preserve the data integrity from unauthorized or undesirable retroactive alterations. Therefore, the commercial driver electronic logging rule compliance and vehicle inspection voice assistant system provides advantages in situations where a time-sharing vehicle driver forgets to log off from the vehicle ELD (132) after his or her on-duty assignments utilizing the automotive vehicle is completed. If the time-sharing vehicle driver is not properly logged off from the vehicle ELD (121), the corresponding ELD and/or DVIR log for this time-sharing vehicle driver may not terminate properly even at the end of his or her on-duty assignment, and erroneously roll into another time-sharing vehicle driver's records, which causes significant inaccuracies in driver-specific ELD and DVIR log generation for a plurality of time-sharing vehicle drivers.

The commercial driver electronic logging rule compliance and vehicle inspection voice assistant system, in accordance with various embodiments of the present invention, prevents or even reverses such erroneous ELD and DVIR log generations and erroneous data pairing between the OBD output parameters and a particular time-shared vehicle driver by empowering each time-sharing vehicle driver to request ELD log handover from the currently logged-in driver, if the currently logged-in driver has accidentally forgotten to log out of the vehicle ELD (121) after his or her vehicle operation time slot. Even if the currently logged-in driver has already exited and moved far away from the automotive vehicle and the vehicle ELD (121), the currently logged-in driver is able to authorize the ELD log signoff and handover remotely by issuing an electronic authorization via a vehicle ELD rule compliance and inspection voice assistant application executed on a portable electronic device. The novel and unique ability to request or grant the transfer of driver-specific ELD/DVIR log generation among a plurality of remotely-located drivers for a time-shared vehicle via ELD log handover request or authorization mobile applications reduces incidents of erroneous ELD/DVIR log generations. The novel commercial driver electronic logging rule compliance and vehicle inspection voice assistant system, as shown in various embodiments of the present invention, also minimizes the need for retroactive driver activity log entry corrections by a fleet management personnel operating the commercial fleet vehicle maintenance and ELD database management system (105).

FIG. 2 shows a timing diagram example (200) among a "post" driver, an auto mechanic, and a "pre" driver for an ELD-equipped shared vehicle operation that requires vehicle inspection a d ELD rule compliance. In this time diagram example (200), the vehicle ELD (e.g. 121 of FIG. 1) is capable of determining and recording a particular driver's vehicle on-duty and off-duty activities among a plurality of time-sharing drivers. Furthermore, in this embodiment of the invention, the vehicle ELD (e.g. 121 of FIG. 1) is capable of generating and recording a plurality of driver-specific driver activity logs and vehicle maintenance requirement logs that can be further analyzed, modified, and processed by the commercial fleet vehicle maintenance and ELD database management system (e.g. 105 of FIG. 1).

In this timing diagram example (200), if the "post" driver has designated work hours from 8 am to 5 pm, and if the time-shared vehicle had its engine on between 8 am to 11 am and also between 1 pm and 5 pm, then the vehicle ELD may determine that "post" driver had an active on-duty period only between 8 am to 11 am, and also between 1 pm and 5 pm, as shown in FIG. 2. On the other hand, if the time-shared vehicle had its engine off between 11 am and 1 pm, as shown in FIG. 2, then the vehicle ELD may also determine that "post" driver had an inactive or "off-duty" periods during that time slot. In some instances, these two inactive or "off-duty" periods may count towards "post" driver's mandatory rest requirements between on-duty driving activities for regulatory compliance.

Similarly, in the timing diagram example (200) of FIG. 2, the commercial fleet vehicle maintenance and ELD database management system (i.e. 105 of FIG. 1) has already allocated a vehicle maintenance time period with a designated auto mechanic, based on the scheduled vehicle operating hours for the "post" driver and the "pre" driver. In this particular example, the vehicle maintenance time is allocated between Monday night and Tuesday before noon. In the preferred embodiment of the invention, the designated auto mechanic is able to review a checklist of potential issues and/or items that require repair or maintenance work from the "post" driver's DVIR, which is electronically shared from the "post" driver vehicle ELD rule compliance and inspection voice assistant application (i.e. 103 of FIG. 1) to the auto mechanic's vehicle ELD rule compliance and inspection voice assistant application (i.e. 113 of FIG. 1). In some cases, the commercial fleet vehicle maintenance and ELD database management system (i.e. 105 of FIG. 1) at least partly serves the role of a cloud storage for the "post" driver's DVIR dataset for convenient on-demand information transmission and sharing with the auto mechanic's vehicle ELD rule compliance and inspection voice assistant application (i.e. 113 of FIG. 1) and also with other elements of the system.

Furthermore, after the "post" driver completes his or her scheduled commercial vehicle operation, the designated auto mechanic is able to physically access and inspect the time-shared vehicle, while reviewing the "post" driver's DVIR electronically from the commercial driver electronic logging rule compliance and vehicle inspection voice assistant system. If any vehicle repair or maintenance work is merited at the auto mechanic's discretion, the auto mechanic may perform necessary work on the automotive vehicle, and update the "post" driver's DVIR accordingly, preferably through an interactive voice guidance provided by the auto mechanic's vehicle ELD rule compliance and inspection voice assistant application (i.e. 113 of FIG. 1). Then, as shown in the timing diagram example (200) of FIG. 2, the time-shared vehicle is returned to a commercial fleet operations facility before noon on Tuesday, where the "pre" driver is able to pick up the time-shared vehicle and electronically verify the auto mechanic-reviewed and amended version of the "post" driver's DVIR by conducting the "pre" driver's own physical, visual, and functional inspection of the time-shared vehicle before commencing a new commercial vehicle operation.

If there are items on the DVIR checklist that are not repaired properly by the designated auto mechanic, the "pre" driver may elect to refuse signing on the auto mechanic-reviewed and amended version of the "post" driver's DVIR, and may even send the time-shared vehicle back to the designated auto mechanic for appropriate repair or maintenance work. On the other hand, if the "pre" driver agrees that all of the items on the DVIR checklist are satisfactorily addressed, then the "pre" driver may confirm or verify with a signature that the auto mechanic-reviewed and amended version of the "post" driver's DVIR is satisfactory, indicating that the time-shared vehicle, in the "pre" driver's opinion, meets all of the functional and safety requirements expected in commercial driving activities. The time-shared vehicle is now ready to be driven by the "pre" driver, and the "pre" driver is additionally required to create a new DVIR file from the commercial driver electronic logging rule compliance and vehicle inspection voice assistant system to provide a new driver's vehicle inspection report during and after the "pre" driver's scheduled commercial vehicle operation.

FIG. 3 shows a communication flow diagram (300) among shared vehicle drivers (301, 307) and a designated auto mechanic (305) who utilizes a commercial driver electronic logging rule compliance and vehicle inspection voice assistant system (303), in accordance with an embodiment of the invention. In this communication flow diagram (300), a "post" driver (301) is a commercial vehicle driver who just completed his or her driving operation in a time-shared vehicle (309), which is typically shared with other drivers in designated work schedules.

In a preferred embodiment of the invention, the "post" driver (301) has an regulatory and/or internal corporate policy obligation to complete a series of steps to create or update a driver's vehicle inspection report (DVIR) provided by the commercial driver electronic logging rule compliance and vehicle inspection voice assistant system (303). The DVIR incorporates AI-based machine entries (e.g. vehicle sensor output parameters, vehicle OBD fault codes, etc.) as well as human manual entries and commentary to identify and indicate potential repair or maintenance work needs (i.e. referred herein also as "defects") related to the time-shared vehicle (309). The "post" driver's DVIR is then transmitted to a commercial fleet vehicle maintenance and ELD database management system (i.e. 105 of FIG. 1) and to electronic devices (i.e. 111, 107 of FIG. 1) utilized by the designated auto mechanic (305) and a next time-shared driver (i.e. also referred herein as a "pre" driver (307)).

Subsequently, the designated auto mechanic (305) reviews the "post" driver's DVIR and performs repairs or maintenance items on the time-shared vehicle (309). Once necessary repairs or maintenance items are completed, the designated auto mechanic (305) updates the "post" driver's DVIR, which in turn converts to an auto mechanic-reviewed and amended version of the "post" driver's DVIR in the commercial driver electronic logging rule compliance and vehicle inspection voice assistant system (303). Then, the "pre" driver (307) compares the auto mechanic-reviewed and amended version of the "post" driver's DVIR against the current (i.e. post-repair) conditions of the time-shared vehicle (309) via visual and functional inspections prior to drive-off, and signs off on the DVIR electronically via the commercial driver electronic logging rule compliance and vehicle inspection voice assistant system (303), if the current conditions are satisfactory. On the other hand, if the current conditions of the time-shared vehicle (309) are not satisfactory, then the "pre" driver (307) can inform the designated auto mechanic (305) that the repair works have not been properly completed and send the time-shared vehicle (309) back to the designated auto mechanic's shop.

Figure 4:
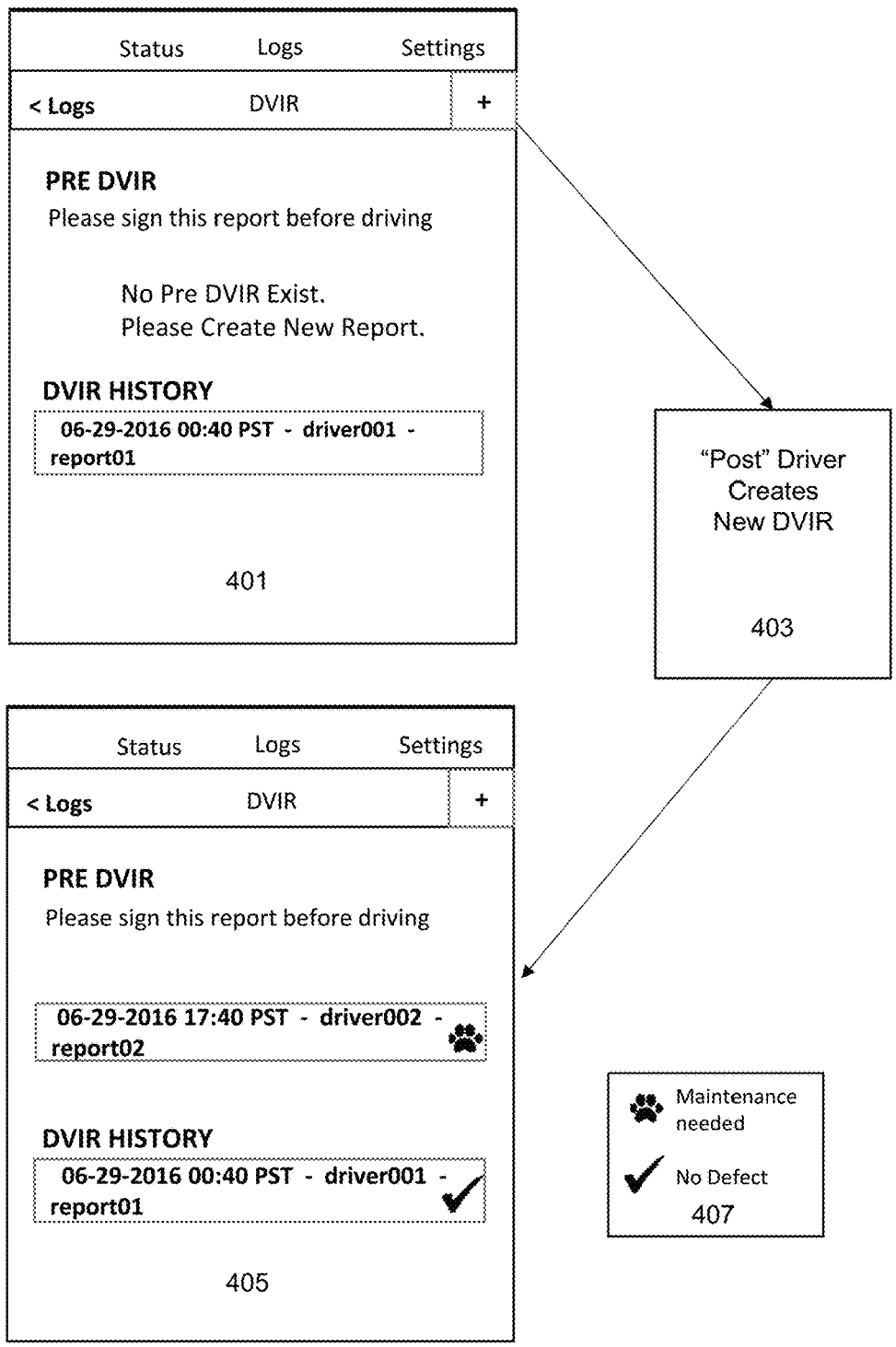
FIG. 4 shows an application flow diagram of a "post" driver vehicle ELD rule compliance and inspection voice assistant application, in accordance with an embodiment of the invention.

FIG. 4 shows an application flow diagram (400) of a "post" driver vehicle ELD rule compliance and inspection voice assistant application, in accordance with an embodiment of the invention. As described previously, the "post" driver vehicle ELD rule compliance and inspection voice assistant application is typically executed on a portable electronic device for a "post" driver. The "post" driver is able to create, amend, and transmit the "post" driver's DVIR by accessing the "post" driver vehicle ELD rule compliance and inspection voice assistant application executed on the portable electronic device for the "post" driver. This portable electronic device is operatively connected to the ELD and OBD data transceiver unit in the automotive vehicle and also to the commercial fleet vehicle maintenance and ELD database management system via the wired and/or wireless data network.

The "post" driver is first encouraged to sign a "Pre DVIR" report before commencing driving, as shown by a first screenshot (401) of the "post" driver vehicle ELD rule compliance and inspection voice assistant application. The first screenshot (401) also shows other drivers' DVIR history (e.g. "06-29-2016 00:40 PST-driver001-report01"), while indicating that a new DVIR report needs to be created for the "post" driver prior to driving. Based on screen menu and interactive voice guidance, the "post" driver creates the new DVIR (i.e. a "post" driver's DVIR), as shown by a second screenshot (403). The new DVIR incorporates both machine-generated vehicle repair or maintenance needs parameters and subjective feedback provided by the "post" driver during his or her commercial vehicle operation. If there are any items or issues identified as needing repair or attention by a designated auto mechanic, then the new DVIR is flagged with "Maintenance needed" icon, as shown in a DVIR legend (407). On the other hand, if there are no items identified as needing repair or attention by the designated auto mechanic, then the new DVIR is flagged with "No Defect" icon, as also shown in the DVIR legend (407). Preferably, the "post" driver vehicle ELD rule compliance and inspection voice assistant application is also configured to process and recognize the "post" driver's voice commands for operation.

As shown by a third screenshot (405) of the application flow diagram (400), the new DVIR (i.e. "06-29-2016 17:40 PST-driver002-report02") associated with the "post" driver's driving activity is stored both locally and in a cloud computing server, and is readily accessible by portable electronic devices utilized by the designated auto mechanic and other time-sharing drivers. In case of the third screenshot (405), the new DVIR is flagged with the "Maintenance needed" icon because the report contains at least some problematic issues with the automotive vehicle originating from machine-generated vehicle repair or maintenance needs parameters and/or vehicle defect commentary provided by the "post" driver during his or her commercial vehicle operation. In contrast, an older archived DVIR in the DVIR history section has a "No Defect" icon adjacent to the file name (i.e. "06-29-2016 00:40 PST-driver001-report01"), because the older archived DVIR does not contain any vehicle defect or repair-worthy information.

The "post" driver vehicle ELD rule compliance and inspection voice assistant application is designed to provide interactive and dynamic voice guidance to the "post" driver throughout the "post" driver's DVIR creation, amendment, signoff, and transmission processes to ensure seamless regulatory compliance associated with DVIR recordkeeping. The interactive and dynamic voice guidance is typically not a pre-recorded static voice narration, but rather an intelligent artificial intelligence-based voice guidance that incorporates real-time changes in vehicle repair or maintenance needs and real-time updates to the "post" driver's DVIR content. For example, when the "post" driver is about to start the automotive vehicle for a commercial vehicle operation, the "post" driver vehicle ELD rule compliance and inspection voice assistant application may decipher the "post" driver's behavior and generate a machine-generated voice reminder to ensure that the "post" driver creates or signs into a driver's vehicle inspection report (DVIR) prior to commencement of the commercial vehicle operation.

FIG. 5 shows a user interface example (500) of a mobile or web driver vehicle inspection report (DVIR), which is incorporated in a commercial driver electronic logging rule compliance and vehicle inspection voice assistant system, in accordance with an embodiment of the invention. This user interface example (500) of the mobile or web DVIR includes vehicle identification information, an "essential inspection list" that includes critical components of the vehicle (e.g. engine, transmission, clutch, steering mechanism, etc.) for rigorous inspection, an "additional inspection list" for vehicle components of secondary importance, and a trailer portion of the vehicle inspection list for a vehicle that may be attached to a trailer.

Preferably, each item on each of these lists can be check-marked or flagged by a commercial vehicle driver to enable a convenient follow-up check by a designated auto mechanic. Furthermore, the user interface example (500) of the mobile or web DVIR also includes subjective feedback and comment sections by a "post" driver, an auto mechanic, a "pre" driver, and an administrator, as shown in FIG. 5. In a preferred embodiment of the invention, the mobile or web DVIR is accessed and provided by at least some of the portable electronic devices that are utilized by commercial vehicle drivers, designated auto mechanics, and commercial vehicle fleet administrators.

Figure 6:
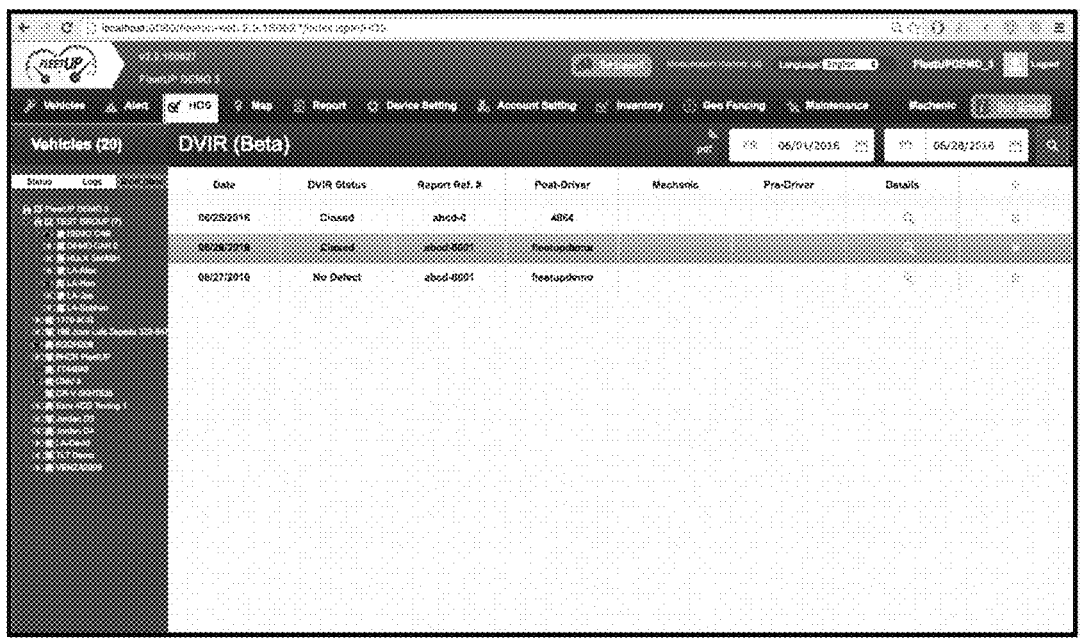
FIG. 6 shows a user interface screenshot from an auto mechanic's vehicle ELD rule compliance and inspection voice assistant application, in accordance with an embodiment of the invention.

FIG. 6 shows a user interface screenshot (600) from an auto mechanic's vehicle ELD rule compliance and inspection voice assistant application, in accordance with an embodiment of the invention. After the "post" driver's DVIR is formalized and/or signed off at the end of the "post" driver's commercial vehicle operation, the auto mechanic may be instructed to review the "post" driver's DVIR via the auto mechanic's vehicle ELD rule compliance and inspection voice assistant application (e.g. 113 of FIG. 1) executed in the portable electronic device (e.g. 111 of FIG. 1).

The auto mechanic may be required to go through a checklist of potential vehicle repair or maintenance needs from the "post" driver's DVIR. As shown in the user interface screenshot (600) from the auto mechanic's vehicle ELD rule compliance and inspection voice assistant application, if any vehicle repair or maintenance work is merited at the auto mechanic's discretion, the auto mechanic may perform necessary work on the automotive vehicle, and update the "post" driver's DVIR accordingly, preferably through an interactive voice guidance provided by the auto mechanic's vehicle ELD rule compliance and inspection voice assistant application. The "DVIR Status" in the user interface screenshot (600) may display "open" for pending review cases, "closed" for a DVIR case that has been fully reviewed and signed off by all relevant parties (i.e. a "pre" driver, a "post" driver, an auto mechanic, etc.), or "no defect" for a DVIR case that did not contain any maintenance or repair issues. Preferably, the auto mechanic's driver vehicle ELD rule compliance and inspection voice assistant application is also configured to process and recognize the auto mechanic's voice commands for operation.

The interactive voice guidance provided by the auto mechanic's vehicle ELD rule compliance and inspection voice assistant application ensures that the required analytical and procedural steps for regulatory compliance are fully satisfied, even if the auto mechanic was not familiar with DVIR and ELD recordkeeping procedures required by federal, state, municipal, or corporate entities. The interactive and dynamic voice guidance from the auto mechanic's vehicle ELD rule compliance and inspection voice assistant application is typically not a pre-recorded static voice narration, but rather an intelligent artificial intelligence-based voice guidance that incorporates real-time changes in vehicle repair or maintenance needs and real-time updates to the "post" driver's DVIR content. For example, if the auto mechanic does not appear to have sufficient time to complete all of the listed repair or maintenance work in the "post" driver's DVIR before the "pre" driver's scheduled operation time, the interactive and dynamic voice guidance from the auto mechanic's vehicle ELD rule compliance and inspection voice assistant application may ask the auto mechanic to contact the "pre" driver or to initiate a vehicle reassignment schedule for the "pre" driver, so that a sufficient time period can be allocated to complete necessary repair or maintenance work for the automotive vehicle linked to the "post" driver's DVIR.

After the "post" driver's DVIR is reviewed and further updated by the auto mechanic after necessary repairs or maintenance work, the auto mechanic-reviewed and amended version of the "post" driver's DVIR is transmitted to the "pre" driver's vehicle ELD rule compliance and inspection voice assistant application and/or to the commercial fleet vehicle maintenance and ELD database management system via the wired and/or wireless data network.

Figure 7:
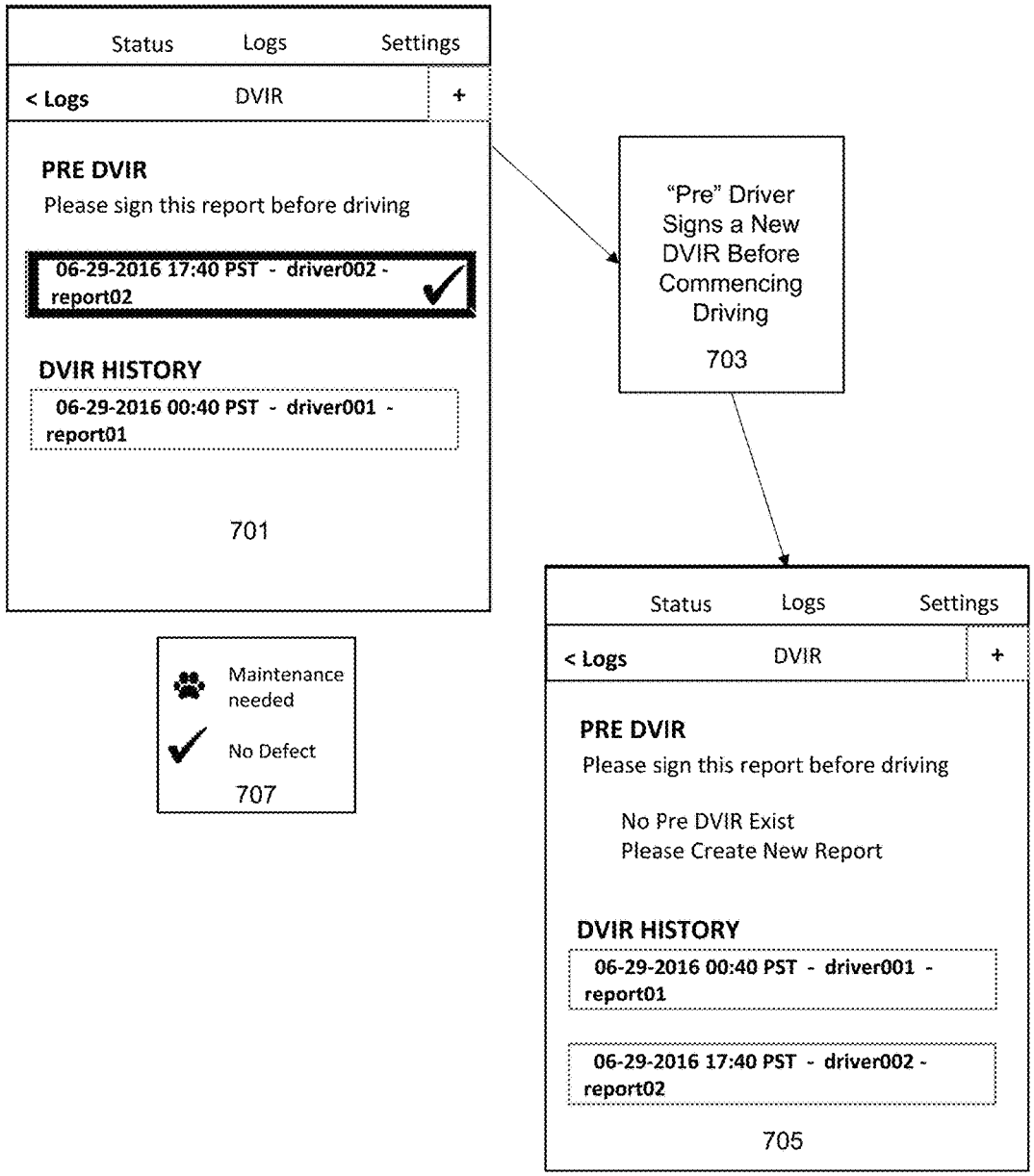
FIG. 7 shows an application flow diagram of a "pre" driver vehicle ELD rule compliance and inspection voice assistant application, in accordance with an embodiment of the invention.

FIG. 7 shows an application flow diagram (700) of a "pre" driver vehicle ELD rule compliance and inspection voice assistant application, in accordance with an embodiment of the invention. The "pre" driver vehicle ELD rule compliance and inspection voice assistant application is typically executed on a portable electronic device for a "pre" driver. The "pre" driver vehicle ELD rule compliance and inspection voice assistant application displays the auto mechanic-reviewed and amended version of the "post" driver's DVIR, and also generates an interactive voice guidance to enable the "pre" driver to review each of the auto mechanic-checked or repaired items before commencing a new commercial driving activity within the "pre" driver's work schedule, as illustrated by a first screenshot (701) of the "pre" driver vehicle ELD rule compliance and inspection voice assistant application. Preferably, the "pre" driver vehicle ELD rule compliance and inspection voice assistant application is also configured to process and recognize the "pre" driver's voice commands for operation.

If there are items on the DVIR checklist that are not repaired properly by the designated auto mechanic, then the "pre" driver may elect to refuse signing on the auto mechanic-reviewed and amended version of the "post" driver's DVIR, and may even send the time-shared automotive vehicle back to the designated auto mechanic for appropriate repair or maintenance work. On the other hand, if the "pre" driver agrees that all of the items on the DVIR checklist are satisfactorily addressed, then the "pre" driver may confirm or verify with a signature that the auto mechanic-reviewed and amended version of the "post" driver's DVIR is satisfactory, as also shown on the first screenshot (701). The "pre" driver's signature or confirmation on the auto mechanic-reviewed and amended version of the "post" driver's DVIR verifies that the time-shared automotive vehicle, in the "pre" driver's opinion, meets all of the functional and safety requirements expected in commercial driving activities.

Then, the "pre" driver is also required to sign a brand new DVIR (i.e. "pre" driver's DVIR) before commencing driving, as shown in a second screenshot (703) of the "pre" driver vehicle ELD rule compliance and inspection voice assistant application. The "pre" driver is able to create, amend, and transmit the "pre" driver's DVIR by accessing the "pre" driver vehicle ELD rule compliance and inspection voice assistant application executed on the portable electronic device for the "pre" driver. This portable electronic device is operatively connected to the ELD and OBD data transceiver unit in the automotive vehicle and also to the commercial fleet vehicle maintenance and ELD database management system via the wired and/or wireless data network.

As shown in a third screenshot (705) of the "pre" driver vehicle ELD rule compliance and inspection voice assistant application in FIG. 7, the "pre" driver is encouraged to sign a "Pre DVIR" report before commencing driving. The third screenshot (705) also shows other drivers' DVIR history (e.g. "06-29-2016 00:40 PST-driver001-report01," "06-29-2016 17:40 PST-driver002-report02), while indicating that a new DVIR report needs to be created for the "pre" driver prior to driving. Based on screen menu and interactive voice guidance, the "pre" driver creates the new DVIR (i.e. a "pre" driver's DVIR), as shown by the third screenshot (705). The new DVIR incorporates both machine-generated vehicle repair or maintenance needs parameters and subjective feedback provided by the "pre" driver during his or her commercial vehicle operation. If there are any items or issues identified as needing repair or attention by a designated auto mechanic, then the new DVIR is flagged with "Maintenance needed" icon, as shown in a DVIR legend (707). On the other hand, if there are no items identified as needing repair or attention by the designated auto mechanic, then the new DVIR is flagged with "No Defect" icon, as also shown in the DVIR legend (707).

The "pre" driver vehicle ELD rule compliance and inspection voice assistant application is designed to provide interactive and dynamic voice guidance to the "pre" driver throughout the "pre" driver's DVIR creation, amendment, signoff, and transmission processes to ensure seamless regulatory compliance associated with DVIR recordkeeping. The interactive and dynamic voice guidance is typically not a pre-recorded static voice narration, but rather an intelligent artificial intelligence-based voice guidance that incorporates real-time changes in vehicle repair or maintenance needs and real-time updates to the "pre" driver's DVIR content. For example, when the "pre" driver is about to start the automotive vehicle for a commercial vehicle operation, the "pre" driver vehicle ELD rule compliance and inspection voice assistant application may decipher the "pre" driver's behavior and generate a machine-generated voice reminder to ensure that the "pre" driver first reviews and signs off on the auto mechanic-reviewed and amended version of the "post" driver's DVIR, and then creates and signs into a new driver's vehicle inspection report (i.e. a "pre" driver's new DVIR) before commencing his or her commercial vehicle operation.

Figure 8:
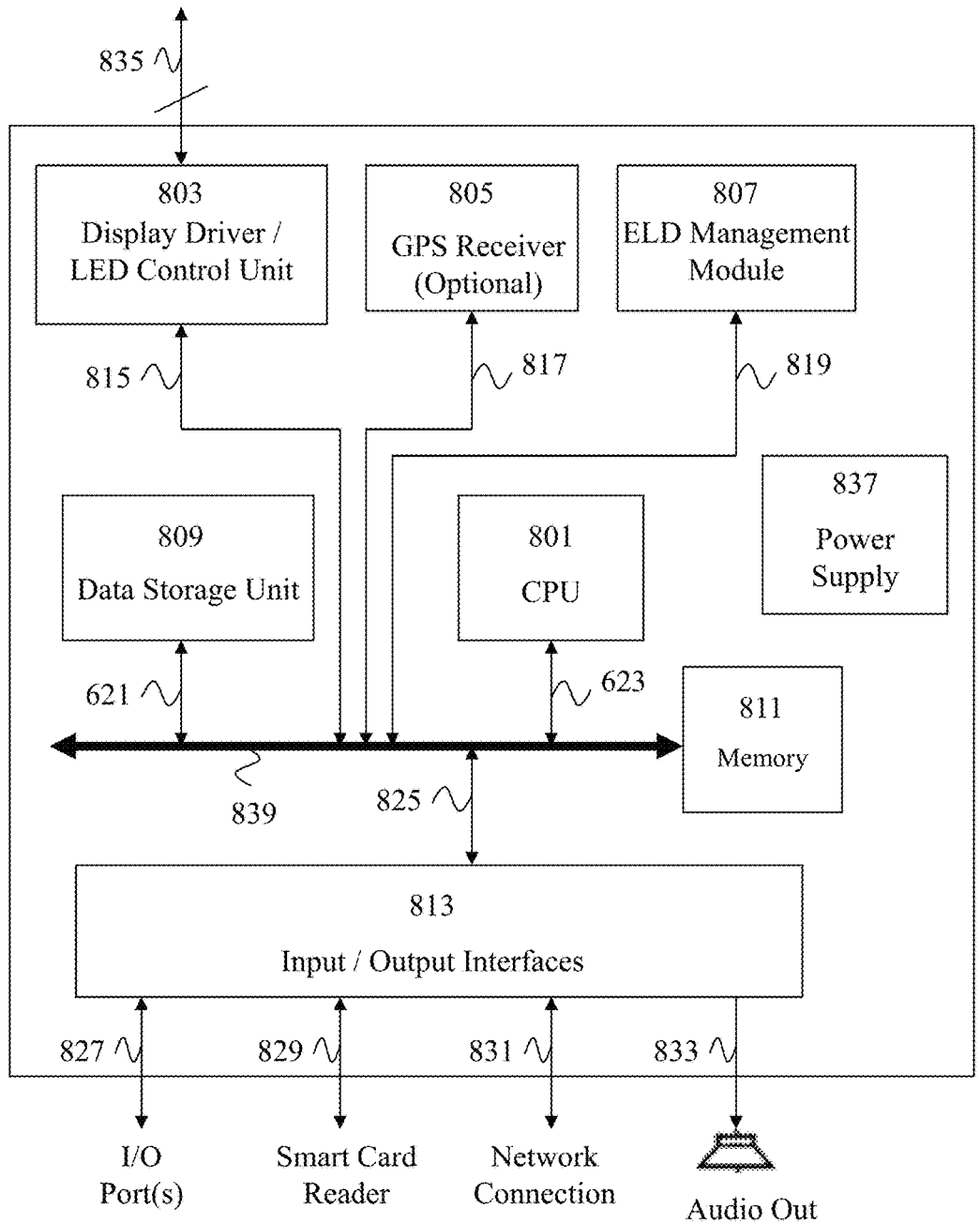
FIG. 8 shows a system block diagram example for a vehicle electronic logging device (ELD), in accordance with an embodiment of the invention.

FIG. 8 shows a system block diagram example (800) for a vehicle electronic logging device (ELD), which is a component in the commercial driver electronic logging rule compliance and vehicle inspection voice assistant system, in accordance with an embodiment of the invention. In this system block diagram example (800), the vehicle ELD (e.g. 121 of FIG. 1) includes a CPU (801), a memory unit (811), a data storage unit (809), a display driver and/or LED control unit (803), an ELD management module (807), an input/output interfaces (813), and a power supply (837). Optionally, the vehicle ELD also has a global positioning system (GPS) receiver (805).

In one embodiment of the invention, these hardware system blocks (e.g. 800) for the vehicle ELD are configured to execute the ELD management module (807) in the CPU (801) and the memory unit (811), wherein the ELD management module (807) contains a plurality of logical blocks, as exemplified by FIG. 8. In another embodiment of the invention, the ELD management module (807) may be hard-coded into a semiconductor chip as a hardware component within the hardware system blocks of the vehicle ELD (e.g. 121 in FIG. 1). Furthermore, the vehicle ELD may also incorporate a wireless transceiver for ELD and OBD data communication with a plurality of time-shared drivers' and/or auto-mechanics' portable electronic devices and a commercial fleet vehicle maintenance and ELD database management system via a wireless data network. Alternatively, the vehicle ELD may be operatively connected to a separate wireless transceiver unit for ELD and OBD data communication with various components of the commercial driver electronic logging rule compliance and vehicle inspection voice assistant system. The wireless transceiver may be configured to transmit or receive data packets via a cellular network, a satellite network, a land-mobile radio network, or via another wireless communication method.

Continuing with FIG. 8, the data storage unit (809) in the vehicle ELD can store OBD data streams from a vehicle OBD device and any information entered by a time-sharing vehicle driver or a commercial fleet operation personnel. Furthermore, the ELD management module (807) executed in the vehicle ELD can retrieve the OBD data streams, environmental sensor readings associated with the time-shared vehicle, and other driver activity-related information to calculate and/or determine current status of a vehicle repair/maintenance need or a specific driver activity (e.g. actively driving, passively idling, resting, signing off from an on-duty status, etc.). For example, vehicle speed, acceleration, engine on/off status, driver position/location sensing within the time-shared vehicle (e.g. driver's seat, passenger seat, sleeper cabin, outside the vehicle, etc.), and other vehicle OBD and sensor output parameters can be utilized by the ELD management module (807) to determine the current status of the vehicle repair/maintenance need and the specific driver activity, from which the driver-specific ELD log and/or DVIR datasets can be generated.

In some embodiments of the invention, these vehicle OBD and sensor output parameters may also be utilized to detect a potential damage or endangerment to a fragile cargo item, excessively cold or hot temperatures inside the time-shared vehicle, extreme humidity or dryness in the time-shared vehicle's cargo space, or excessive fuel consumption by a particular driver. Any of these detected information during a particular driver's operating hours may be synthesized and recorded as part of the driver-specific ELD log, if desired by the commercial fleet operation personnel or government regulators.

In some instances, the vehicle ELD may integrate or connect to location tracking unit(s), such as the GPS receiver (805) in FIG. 8. An abrupt outage or improper GPS coordinate readings for the time-shared vehicle from the GPS receiver (805) or another location tracking unit may indicate a potential endangerment to the currently logged-in driver, which can be detected and alerted to the commercial fleet operation personnel or the government regulators via a wireless data network. The ELD management module (807) can be configured to generate textual, aural, or multimedia alerts to the currently logged-in driver, the commercial fleet operation personnel, and/or the government regulators, based on alerts determined by the vehicle ELD.

Furthermore, the vehicle ELD may also generate alerts or indicate monitoring statuses via a plurality of LED indicator lights connected to the display driver and/or LED control unit (803) and a display driver output (835). Moreover, various hardware components (i.e. 801, 803, 805, 807, 809, 811, 813, 837) of the vehicle ELD can transmit and receive data among each other via an internal bus (839) and various electrical connections (815, 817, 819, 821, 823, 825).

In the embodiment of the invention as shown in FIG. 8, the vehicle ELD also includes the power supply unit (837), which supplies electrical power to various hardware components (i.e. 801, 803, 805, 807, 809, 811, 813, 837) in the hardware system blocks of the vehicle ELD. Furthermore, the vehicle ELD may also include the input/output interfaces (813) that can accommodate data communication for I/O ports (827), smart card readers (829), network connections (831), and an audio out connection (833) to a speaker. As shown in the system block diagram example (800), in this embodiment of the invention, the input/output interfaces (813) are operatively connected to the internal bus (839), which can communicate with any other components in the vehicle ELD.

Figure 9:
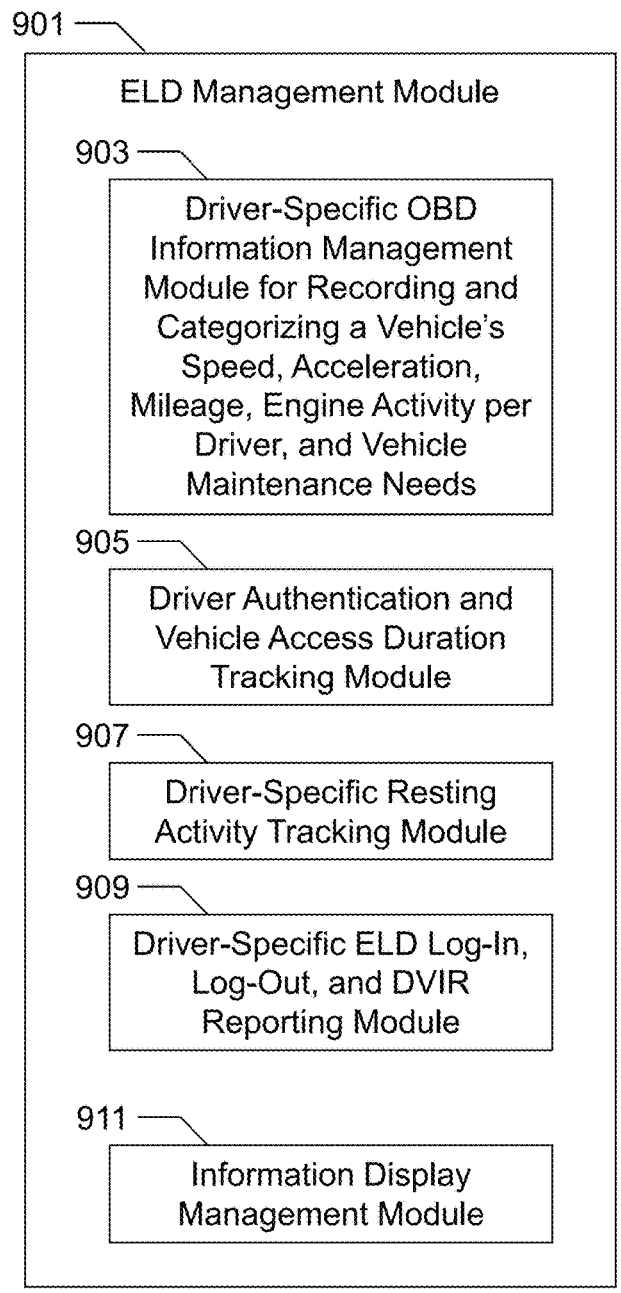
FIG. 9 shows an embodiment of a vehicle electronic logging device (ELD) management module), in accordance with an embodiment of the invention.

FIG. 9 shows an embodiment of a vehicle electronic logging device (ELD) management module (901), which corresponds to element 807 in FIG. 8, in one embodiment of the invention. The vehicle ELD management module (901) is typically integrated into a vehicle electronic logging device (ELD), which is typically a vehicle-installed specialized hardware device that connects to a vehicle OBD device and an ELD/OBD data transceiver unit, as previously shown in FIG. 1.

In a preferred embodiment of the invention, the vehicle ELD management module (901) comprises a driver-specific OBD information management module (903) for recording and categorizing a vehicle's speed, acceleration, mileage, engine activity, OBD fault codes, and vehicle repair/maintenance-related output parameters per driver. An OBD data stream which contains vehicular dynamics, engine on/off statuses, OBD fault codes (if any), and fuel consumption information can be stored, categorized, and extracted in the driver-specific OBD information management module (903).

The vehicle ELD management module (901) also includes a driver authentication and vehicle access duration tracking module (905). This module is configured to authenticate a particular driver operating a time-shared vehicle among a plurality of registered drivers in the vehicle ELD, and is also configured to track and record the particular driver's vehicle access duration and any vehicle OBD fault codes or maintenance needs. The particular driver's vehicle access duration may be inferred by the driver authentication timing with the vehicle ELD, speedometer readings, and engine on/off statuses that suggest the particular driver's on-duty driving activities or resting periods. Furthermore, the particular driver's vehicle access duration can be made more precise by manual or machine-based automated entry of the particular driver's expected operating hours in the time-shared vehicle.

Furthermore, the vehicle ELD management module (901) also incorporates a driver-specific resting activity tracking module (907), which is configured to determine, track, and record a driver's resting periods based on machine-generated vehicle data parameters, such as motion sensor values in the sleeper cabin, driver authentication timing with the vehicle ELD, speedometer readings, engine on/off statuses, and driver operation schedule entries. In addition, the driver's resting periods can be tracked more accurately if the driver's expected resting schedules are uploaded to the driver-specific resting activity tracking module (907).

Continuing with FIG. 9, the vehicle ELD management module (901) also incorporates a driver-specific ELD log-in, log-out, and DVIR reporting module (909), which is capable of initiating (i.e. "logging in"), terminating (i.e. "logging out" or signing off), and/or transferring (i e "handover") a driver-specific ELD or DVIR log generation privileges in the vehicle ELD. A plurality of drivers who time-share a vehicle can utilize one or more portable electronic devices and corresponding remote ELD/DVIR log handover mobile applications to request, grant, or deny a driver-specific ELD/DVIR log handover for the vehicle ELD installed in the time-shared vehicle, even when a particular driver has forgotten to log out of the vehicle ELD after his or her allotted driving operation period and is no longer near the time-shared vehicle.

Moreover, the vehicle ELD management module (901) also includes an information display management module (911). The information display management module (911) is configured to display current driver log-in status time graphs, DVIR information, other textual information, alerts, and ELD log handover request or authorization interfaces on a display panel inside the time-shared vehicle, or on one or more display panels connected to portable electronic devices for a plurality of time-shared vehicle drivers. Furthermore, these graphical and textual information associated with the vehicle ELD can also be displayed by the commercial fleet vehicle maintenance and ELD database management system.

In one embodiment of the invention, various modules (903, 905, 907, 909, 911) contained inside the ELD management module (901) may be software elements that are executed in a CPU/APU or a memory unit of a hardware device, such as system block components (e.g. 800 of FIG. 8) of a vehicle electronic logging device (ELD). In another embodiment of the invention, the ELD management module (901) may be a combination of software elements and hardware elements that conceptually constitute various components (903, 905, 907, 909, 911) of the ELD management module (901). Yet in another embodiment of the invention, the ELD management module (901) may be entirely implemented into a semiconductor chip, which makes the ELD management module (901) a system-on-chip (SoC) hardware solution.

Figure 10:
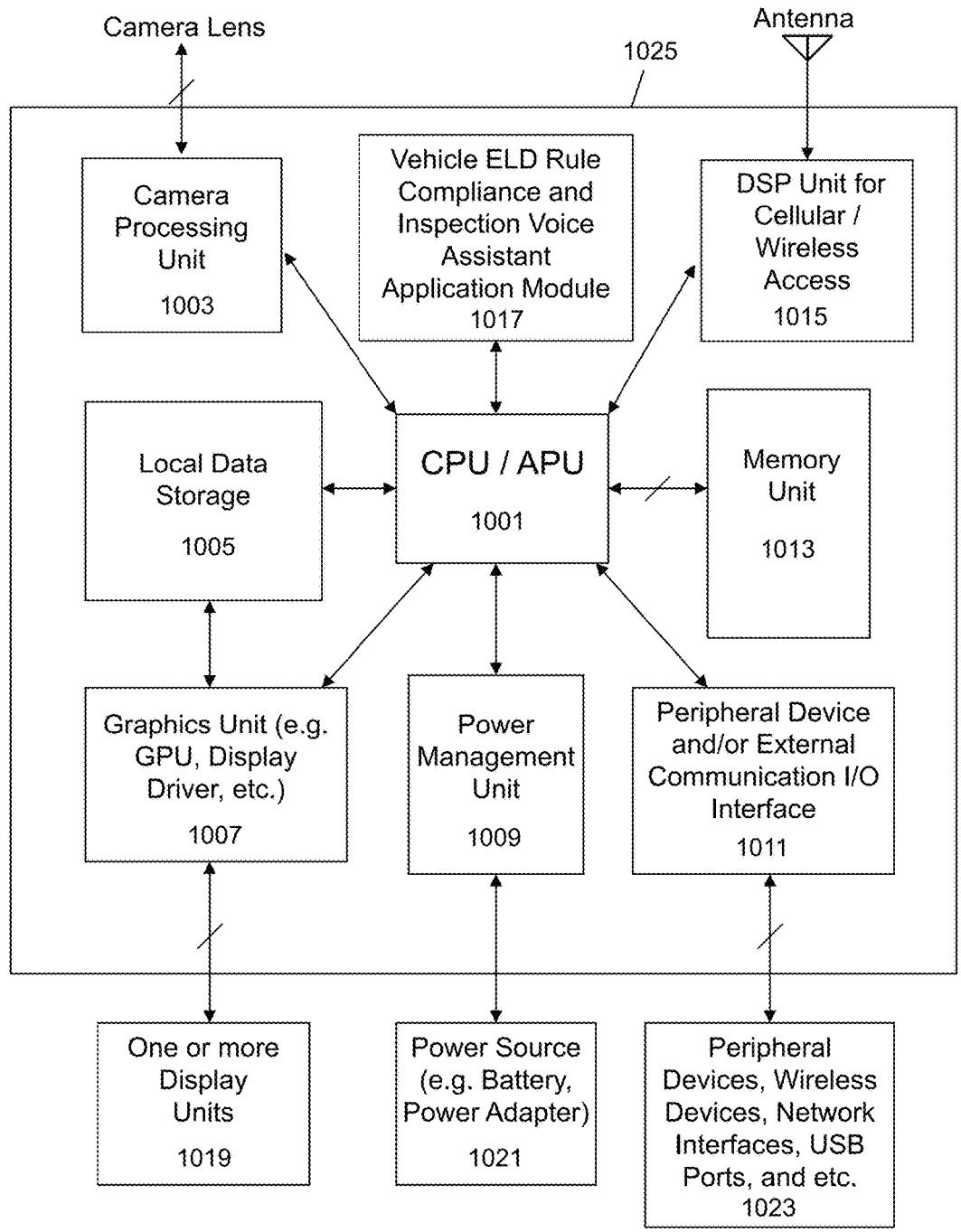
FIG. 10 shows an example of a portable electronic device incorporating a vehicle ELD rule compliance and inspection voice assistant application module, in accordance with an embodiment of the invention.

FIG. 10 shows an example of a portable electronic device incorporating a vehicle ELD rule compliance and inspection voice assistant application module (1017), in accordance with an embodiment of the invention. The vehicle ELD rule compliance and inspection voice assistant application module (1017) contains at least one of "post" drivers', "pre" drivers', and auto mechanics' vehicle ELD rule compliance and inspection voice assistant applications, which are configured to create, modify, request, authorize, deny, or share ELD driver logs and/or DVIR data logs among related participants for DVIR creation, administration, and modification.

In a preferred embodiment of the invention, the portable electronic device may be a smart phone, a tablet computer, a notebook computer, a personal computer, a special-purpose proprietary ELD data controller device, or another transportable electronic device that can execute a vehicle ELD rule compliance and inspection voice assistant application in a CPU, an APU, and/or a memory unit of the portable electronic device. The vehicle ELD rule compliance and inspection voice assistant application module (1017) may comprise software elements (e.g. a vehicle ELD rule compliance and inspection voice assistant mobile app) stored in a non-volatile data storage, or embedded software elements hard-coded and incorporated in a semiconductor chip as a piece of hardware. The portable electronic device is configured to provide vehicle ELD rule compliance and inspection voice assistant user interfaces for creating, modifying, authorizing, and sharing DVIR case files, and may also function as a multi-purpose electronic communication device that provides Internet web browsing, text messaging, email communication, and voice call capabilities.

As shown in the system block diagram example (1000) of FIG. 10, the portable electronic device has a CPU or an APU (1001), which is operatively connected to a memory unit (1013), a local data storage (1005), a camera processing unit (1003), a graphics unit (1007) (e.g. a graphics processor, a display driver, and etc.), a power management unit (1009), a peripheral device and/or external communication I/O interface (1011), a digital signal processing (DSP) unit for cloud server access (1015), the vehicle ELD rule compliance and inspection voice assistant application module (1017), and a sound unit. These logical units may be placed on a single printed circuit board (1025) in one embodiment of the invention, or a plurality of printed circuit boards in another embodiment of the invention.

In the preferred embodiment of the invention, the CPU/APU (1001) is configured to control each logical unit operatively (i.e. directly or indirectly) connected to the CPU/APU (1001). The memory unit (1013) typically comprises volatile memory banks based on DRAM's. In some embodiments of the invention, the memory unit (1013) may use non-volatile memory technologies such as SRAM's and/or Flash memory. The memory unit (1013) is capable of storing programs and applications which can be executed by the CPU/APU (1001), the graphics unit (1007), or another logical unit operatively connected to the memory unit (1013).

In particular, in the preferred embodiment of the invention, instructions, datasets, and codes originating from the vehicle ELD rule compliance and inspection voice assistant application module (1017) can be executed on the CPU/APU (1001) and the memory unit (1013) of the portable electronic device to provide vehicle ELD rule compliance and inspection voice assistant mobile applications. The vehicle ELD rule compliance and inspection voice assistant application module (1017) may be a separate standalone logical unit, as shown in FIG. 10, or a collection of software or machine codes associated with the vehicle ELD rule compliance and inspection voice assistant applications in the local data storage (1005). Preferably, the vehicle ELD rule compliance and inspection voice assistant application module (1017) contains one or more logical units (e.g. 903, 905, 907, 909, 911) previously described in FIG. 9.

Continuing with FIG. 10, any software and programs executed on the CPU/APU (1001) and the memory unit (1013) of the portable electronic device may be part of an operating system, or a separate application installed on the operating system of the portable electronic device. Furthermore, the camera processing unit (1003) is operatively connected to a camera lens on the portable electronic device, and is able to process image-related data from the camera lens in association with the CPU/APU (1001) and/or other logical units in the portable electronic device to produce live recorded video information, which may be stored in the local data storage (1005). In addition, a microphone operatively connected to the sound unit can produce live recorded audio information, which can also be stored in the local data storage (1005).

Moreover, as shown in FIG. 10, the digital signal processing (DSP) unit for cloud server access (1015) is operatively connected to an radio frequency (RF) antenna. The DSP unit for cloud server access (1015) is generally configured to receive and transmit radio data and/or voice signals wirelessly for a desktop computer, a laptop, a mobile communication device, an electronic goggle, or another suitable electronic system. In addition, the power management unit (1009) is operatively connected to a power supply unit and a power source (e.g. battery, power adapter) (1021), and the power management unit (1009) generally controls power supplied to the portable electronic device and its logical units. Moreover, the peripheral device and/or external communication I/O interface (1011) as shown in FIG. 10 can be operatively connected to one or more peripheral devices, wireless devices, USB ports, and other external data communication media (1023).

Continuing with FIG. 10, in the preferred embodiment of the invention, the graphics unit (1007) in the system block diagram example (1000) for the portable electronic device comprises a graphics processor, a display driver, a dedicated graphics memory unit, and/or another graphics-related logical components. In general, the graphics unit (1007) is able to process and communicate graphics-related data with the CPU/APU (1001), the display driver, and/or the dedicated graphics memory unit. The graphics unit (1007) is also operatively connected to one or more display units (1019). In addition, the CPU/APU (1001) may be operatively connected to the sound unit which contains audio-related logical components for generation or recording of audio data from a microphone operatively connected to the portable electronic device.

Various embodiments of the present invention provide several key advantages over conventional methods of vehicle maintenance management and recordkeeping for regulatory compliance in commercial vehicle operations. One advantage of an embodiment of the present invention is providing a novel commercial driver vehicle inspection and driver log-tracking communication system that seamlessly provides vehicle maintenance log and driver activity log tracking and related multi-party communications among vehicle time-sharing drivers, auto mechanics, fleet managers, and regulatory compliance authorities.

Furthermore, another advantage of an embodiment of the present invention is providing a novel, dynamically-adaptable intelligent voice assistant that is incorporated into the novel commercial driver vehicle inspection and driver log-tracking communication system to guide time-sharing drivers and auto mechanics through a series of steps for initiating and updating vehicle inspection and maintenance logs using voice assistance in their native languages. In addition, another advantage of an embodiment of the present invention is providing a novel method for operating the novel commercial driver vehicle inspection and driver log-tracking communication system for multi-party utilization.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A commercial driver electronic logging rule compliance and vehicle inspection voice assistant system comprising:
   a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, OBD fault codes, and other vehicle diagnostics data as a raw OBD data stream;
   a vehicle electronic logging device (ELD) connected to the vehicle OBD device, wherein the vehicle ELD is configured to generate a driver-specific ELD log that contains a currently logged-in driver's on-duty, off-duty, and resting activities associated with the vehicle, and a driver vehicle inspection report (DVIR) utilized in a vehicle electronic logging handover authorization among a "post" driver, an auto mechanic, and a "pre" driver for time-shared commercial operation and maintenance of the vehicle, wherein the DVIR dynamically incorporates descriptions, issues, and items identifying potential repair or maintenance needs for the vehicle that must be addressed before the vehicle electronic logging handover authorization between the "post" driver and the "pre" driver for the time-shared commercial operation;
   an ELD and OBD data transceiver connected to the vehicle ELD, wherein the ELD and OBD data transceiver is configured to transmit ELD, DVIR, and OBD data to components of the commercial driver electronic logging rule compliance and vehicle inspection voice assistant system that are remotely located outside the vehicle;
   a "post" driver vehicle ELD rule compliance and inspection voice assistant application executed in a first portable electronic device for the currently logged-in driver, whose driving activities and vehicle repair or maintenance needs are currently interpreted, analyzed, and recorded by the vehicle ELD as the driver-specific ELD log and the DVIR, wherein the "post" driver vehicle ELD rule compliance and inspection voice assistant application provides a first interactive voice guidance to the "post" driver to ensure regulatory compliance for the driver-specific ELD log and the DVIR creation and modifications;
   an auto mechanic's vehicle ELD rule compliance and inspection voice assistant application executed in a second portable electronic device for the auto mechanic, who reviews the DVIR transmitted from the "post" driver vehicle ELD rule compliance and inspection voice assistant application to the auto mechanic's vehicle ELD rule compliance and inspection voice assistant application to verify and work on the vehicle repair or maintenance needs, wherein the auto mechanic's vehicle ELD rule compliance and inspection voice assistant application provides a second interactive voice guidance to the auto mechanic to ensure the regulatory compliance, as the auto mechanic repairs the vehicle and modifies the DVIR for each item or issue listed in the DVIR;
   a commercial fleet operation vehicle maintenance and ELD database management system that analyzes, stores, and categorizes driver-specific ELD logs and DVIR case files for a plurality of drivers who time-share the vehicle; and
   a data communication network configured to provide a wireless data information transfer among the vehicle ELD, the ELD and OBD data transceiver, the first portable electronic device, the second portable electronic device, the third portable electronic device, and the commercial fleet operation vehicle maintenance and ELD database management system.

2. The commercial driver electronic logging rule compliance and vehicle inspection voice assistant system of claim 1, further comprising a "pre" driver vehicle ELD rule compliance and inspection voice assistant application executed in a third portable electronic device for the "pre" driver, who reviews the DVIR from the auto mechanic's vehicle ELD rule compliance and inspection voice assistant application to conduct a visual and functional inspection of completed repairs for each item or issue listed in the DVIR, wherein the "pre" driver vehicle ELD rule compliance and inspection voice assistant application provides a third interactive voice guidance to the "pre" driver to ensure the regulatory compliance to the "pre" driver for verification of the completed repairs and finalization of the DVIR for regulatory submission.

3. The commercial driver electronic logging rule compliance and vehicle inspection voice assistant system of claim 1, further comprising a computer server with a CPU and a memory unit that execute the commercial fleet vehicle maintenance and ELD database management system.

4. The commercial driver electronic logging rule compliance and vehicle inspection voice assistant system of claim 1, wherein the vehicle repair or maintenance needs incorporated in the DVIR are identified by the OBD fault codes originating from the vehicle OBD device.

5. The commercial driver electronic logging rule compliance and vehicle inspection voice assistant system of claim 1, further comprising in-vehicle sensors and the engine control unit (ECU) that are operatively connected to the vehicle OBD device.

6. The commercial driver electronic logging rule compliance and vehicle inspection voice assistant system of claim 1, wherein the vehicle ELD comprises a CPU, a memory unit, an ELD management module, a data storage unit, a power supply, and input and output interfaces.

7. The commercial driver electronic logging rule compliance and vehicle inspection voice assistant system of claim 6, wherein the ELD management module comprises a driver-specific OBD information management module for recording and categorizing the vehicle's speed, acceleration, mileage, engine activity, and vehicle maintenance needs per driver, a driver authentication and vehicle access duration tracking module, a driver-specific resting activity tracking module, a driver-specific ELD log-in, log-out, and DVIR reporting module, and an information display management module.

8. The commercial driver electronic logging rule compliance and vehicle inspection voice assistant system of claim 1, wherein the first portable electronic device, the second portable electronic device, and the third portable electronic device are smart phones, tablet computers, notebook computers, personal computers, or specialized driving activity communication devices.

9. The commercial driver electronic logging rule compliance and vehicle inspection voice assistant system of claim 1, wherein the vehicle is a truck, a van, a bus, a taxi, a limousine, or a passenger vehicle, which is time-shared among the plurality of drivers.

10. The commercial driver electronic logging rule compliance and vehicle inspection voice assistant system of claim 1, wherein the data communication network is a cellular communication network, a satellite communication network, a land-mobile radio communication network, a wireless local area network, or a combination thereof.

11. The commercial driver electronic logging rule compliance and vehicle inspection voice assistant system of claim 1, wherein the first interactive voice guidance generates a pre-violation alert to the "post" driver preemptively to prevent or avoid a federal, state, or municipal violation notice related to a mandatory driver rest requirement, a substitute driver requirement, a speed limit requirement, a vehicle maintenance requirement, or another regulatory requirement for commercial drivers.

12. The commercial driver electronic logging rule compliance and vehicle inspection voice assistant system of claim 2, wherein the "post" driver vehicle ELD rule compliance and inspection voice assistant application, the auto mechanic's vehicle ELD rule compliance and inspection voice assistant application, and the "pre" driver vehicle ELD rule compliance and inspection voice assistant application are each configured to process and recognize voice commands.

* * * * *